(12) United States Patent
Park et al.

(10) Patent No.: US 7,586,479 B2
(45) Date of Patent: Sep. 8, 2009

(54) DISPLAY DEVICE AND DRIVING METHOD THEREOF

(75) Inventors: Jong-Woung Park, Seongnam-si (KR); Joo-Hyung Lee, Gwacheon-si (KR); Hyung-Guel Kim, Yongin-si (KR); Kee-han Uh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 852 days.

(21) Appl. No.: 11/149,925

(22) Filed: Jun. 10, 2005

(65) Prior Publication Data

US 2005/0275616 A1 Dec. 15, 2005

(30) Foreign Application Priority Data

Jun. 10, 2004 (KR) ............... 10-2004-0042574
Aug. 13, 2004 (KR) ............... 10-2004-0064038

(51) Int. Cl.
G09G 3/36 (2006.01)
G09G 5/00 (2006.01)
G06F 3/038 (2006.01)
G02F 1/1335 (2006.01)
G02F 1/133 (2006.01)
G06F 3/041 (2006.01)
G06F 3/042 (2006.01)
G06K 11/06 (2006.01)
G08C 21/00 (2006.01)

(52) U.S. Cl. .............. 345/102; 178/18.01; 178/18.09; 345/87; 345/101; 345/173; 345/175; 345/204; 345/207; 349/61; 349/72

(58) Field of Classification Search .............. 345/173, 345/175, 204, 207, 87, 101, 102; 349/61, 349/72; 178/18.01, 18.09

See application file for complete search history.

(56) References Cited

U.S. PATENT DOCUMENTS

| | | | | |
|---|---|---|---|---|
| 5,151,688 | A | * | 9/1992 | Tanaka et al. ............... 345/104 |
| 5,933,089 | A | * | 8/1999 | Katada ...................... 340/7.55 |
| 6,087,703 | A | * | 7/2000 | Ohta et al. .................. 257/461 |
| 6,825,828 | B2 | * | 11/2004 | Burke et al. ................. 345/101 |
| 6,864,882 | B2 | * | 3/2005 | Newton ....................... 345/173 |
| 7,009,663 | B2 | * | 3/2006 | Abileah et al. ................ 349/12 |
| 7,068,333 | B2 | * | 6/2006 | Ohashi et al. ................. 349/68 |

(Continued)

FOREIGN PATENT DOCUMENTS

CN        1393728      1/2003

(Continued)

*Primary Examiner*—Sumati Lefkowitz
*Assistant Examiner*—Alexander S. Beck
(74) *Attorney, Agent, or Firm*—Cantor Colburn LLP

(57) ABSTRACT

A display device includes a panel assembly, a backlight unit supplying light to the panel assembly, a first photosensor, a second photosensor, a sensing signal processor and a signal controller. The first photosensor is supplied with ambient light and light from the backlight unit to generate a first sensing signal. The second photosensor is blocked from the ambient light and receives the light from the backlight unit to generate a second sensing signal. The sensing signal processor receives the first and the second sensing signals from the first and the second photosensors for processing. The signal controller determines a sensing state responsive to processed first and second sensing signals from the sensing signal processor and performing a predetermined control operation responsive to the sensing state.

32 Claims, 13 Drawing Sheets

U.S. PATENT DOCUMENTS 7,301,523 B2 * 11/2007 Kamei ........................ 345/102
2002/0167637 A1 11/2002 Burke et al.

FOREIGN PATENT DOCUMENTS

| CN | 1519623 | 8/2004 |
| JP | 2002072920 | 3/2002 |
| WO | 03073159 | 9/2003 |

* cited by examiner

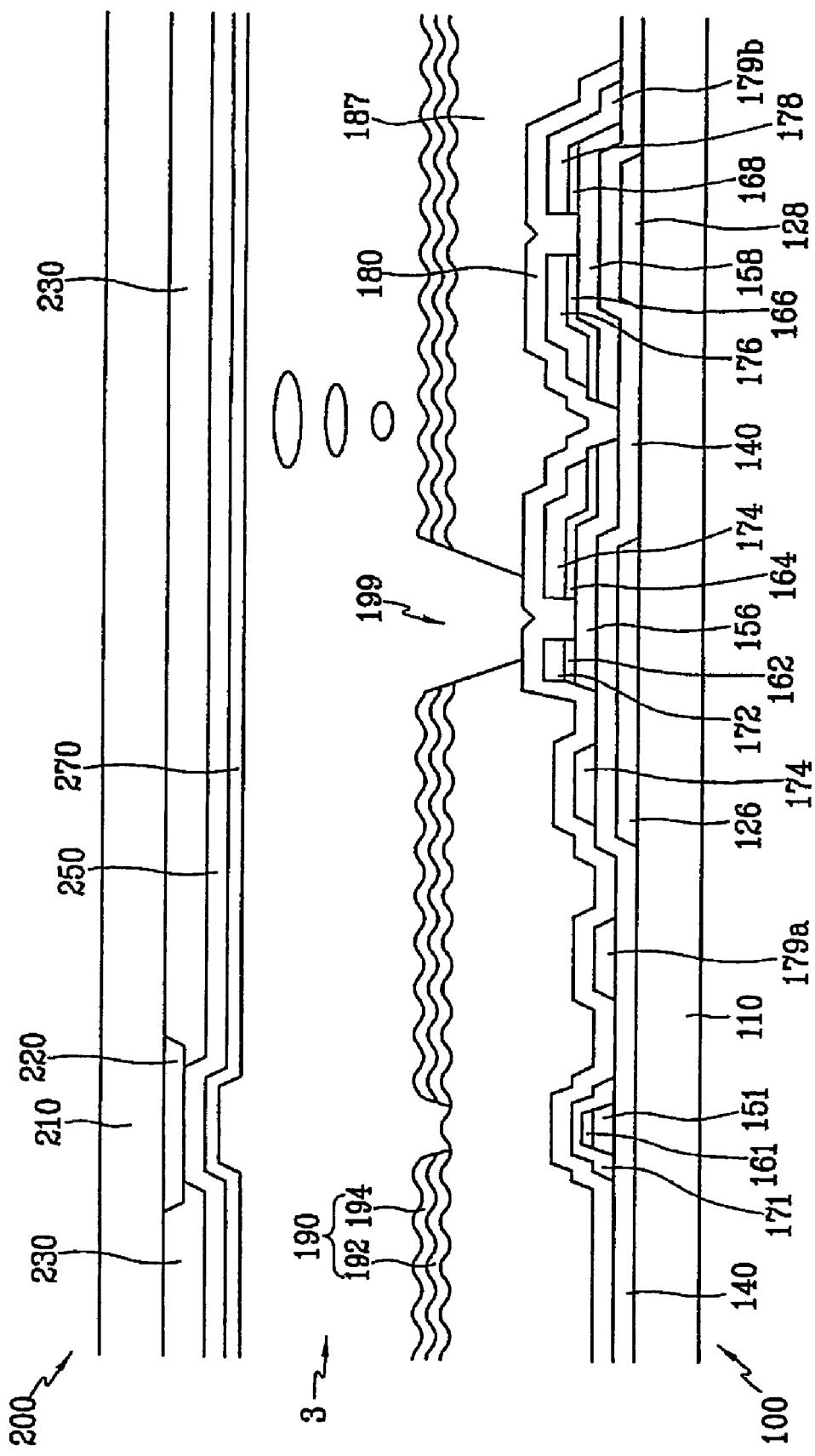

DISPLAY DEVICE AND DRIVING METHOD THEREOF

This application claims priority to Korean Patent Application Nos. 2004-0042574 filed on Jun. 10, 2004, and 2004-0064038 filed on Aug. 13, 2004, and all the benefits accruing therefrom under 35 U.S.C §119, and the contents of which in their entirety are herein incorporated by reference.

BACKGROUND OF THE INVENTION (a) Field of the Invention

The present invention relates to a display device and a driving method thereof.

(b) Description of Related Art

A typical liquid crystal display (LCD) device includes a lower panel and an upper panel and a liquid crystal (LC) layer with dielectric anisotropy disposed between the lower and upper panels. The lower and upper panels are provided with pixel electrodes and a common electrode. The pixel electrodes are arranged in a matrix and each pixel electrode is connected to a switching element Q such as a thin film transistor (TFT). Each row of pixel electrodes is sequentially supplied with data voltages. The common electrode covers an entire surface of the upper panel and is supplied with a common voltage. The pixel electrode, the common electrode and the LC layer therebetween form an LC capacitor, and the LC capacitor is a basic unit comprising each pixel together with the switching element Q.

The LCD device displays desired images by adjusting a strength of an electric field applied to the LC layer to control a transmittance of light passing through the lower and upper panels. In order to prevent deterioration of the LC layer due to applying one directional electric fields to the LC layer, a polarity of the data voltages is reversed with respect to the common voltage for each frame, each pixel row or each pixel.

Recently, products to provide such LCD devices with a photosensor have been developed. When, for example, a hand or a touch pen touches a screen of an LCD device, the photosensor provides a response to a variation of light according to a position of the hand or the touch pen. The LCD device determines touch information such as presence or absence of a touch and a position of the touch for transmittance to an external device. The external device transmits image signals responsive to the touch information. The photosensor is formed by a separate touch panel in the LCD device. However, such a separate touch panel increases a thickness and weight of the LCD device and makes it hard to display detailed characters or pictures.

Therefore, a technique of forming a photosensor in a pixel displaying images has been developed. However, such a photosensor causes many errors in photo sensing responsive to touch since an output characteristic of the photosensor is varied depending on ambient circumstances, i.e., an intensity of external light, a luminance of a backlight, temperature, and so on. Accordingly, the LCD device may perceive no touch although a touch has occurred or may perceive a touch although no touch has occurred.

SUMMARY OF THE INVENTION

An object of the present invention is to provide a display device and a driving method thereof capable of generating a stable output signal of a photosensor in order to determine touch information accurately responsive to user touch regardless of variation of external circumstances.

A display device is provided, which includes a panel assembly, a backlight unit supplying light to the panel assembly, a first photosensor, a second photosensor, a sensing signal processor, and a signal controller. The first photosensor is supplied with ambient light and light from the backlight unit to generate a first sensing signal. The second photosensor is blocked from the ambient light and receives the light from the backlight unit to generate a second sensing signal. The sensing signal processor receives the first and the second sensing signals from the first and second photosensors for processing. The signal controller determines a sensing state responsive to the processed first and second sensing signals from the sensing signal processor and performs a predetermined control operation responsive to the sensing state.

A driving method of a display device provided with a backlight unit supplying light is provided, which includes receiving ambient light and light from the backlight unit at a first photosensor to generate a first sensing signal, blocking the ambient light and receiving the light from the backlight unit at a second photosensor to generate a second sensing signal, generating a state judgment signal in response to the first and the second sensing signals, and determining a sensing state in response to an intensity of the ambient light as indicated by the state judgment signal. The state judgment signal represents a difference between the first and second sensing signals.

A display device is provided, which includes a panel assembly, a backlight unit supplying light to the panel assembly, a first photosensor, a second photosensor, a third photosensor, a sensing signal processor and a signal controller. The first photosensor receives ambient light and light from the backlight unit to generate a first sensing signal. The second photosensor is blocked from the ambient light and receives the light from the backlight unit to generate a second sensing signal. The third photosensor receives the ambient light and the light from the backlight unit to generate a third sensing signal responsive to user touch. The sensing signal processor processes the first to third sensing signals from the first to third photosensor. The signal controller regulates the third sensing signal responsive to processed first and second sensing signals.

A driving method of a display device provided with a backlight unit supplying light is provided, which includes receiving ambient light and light from the backlight unit at a first photosensor to generate a first sensing signal, blocking the ambient light and receiving the light from the backlight unit at a second photosensor to generate a second sensing signal, receiving the ambient light and the light from the backlight unit at a third photosensor to generate a third sensing signal responsive to touch, and regulating the third sensing signal in response to the first and the second sensing signals.

BRIEF DESCRIPTION OF THE DRAWINGS

The present invention will become more apparent by describing exemplary embodiments thereof in detail with reference to the accompanying drawings in which:

FIGS. 4 and 5 are sectional views taken along lines IV-IV' and V-V' in FIG. 3, respectively;

DETAILED DESCRIPTION OF THE INVENTION

Figure 1:
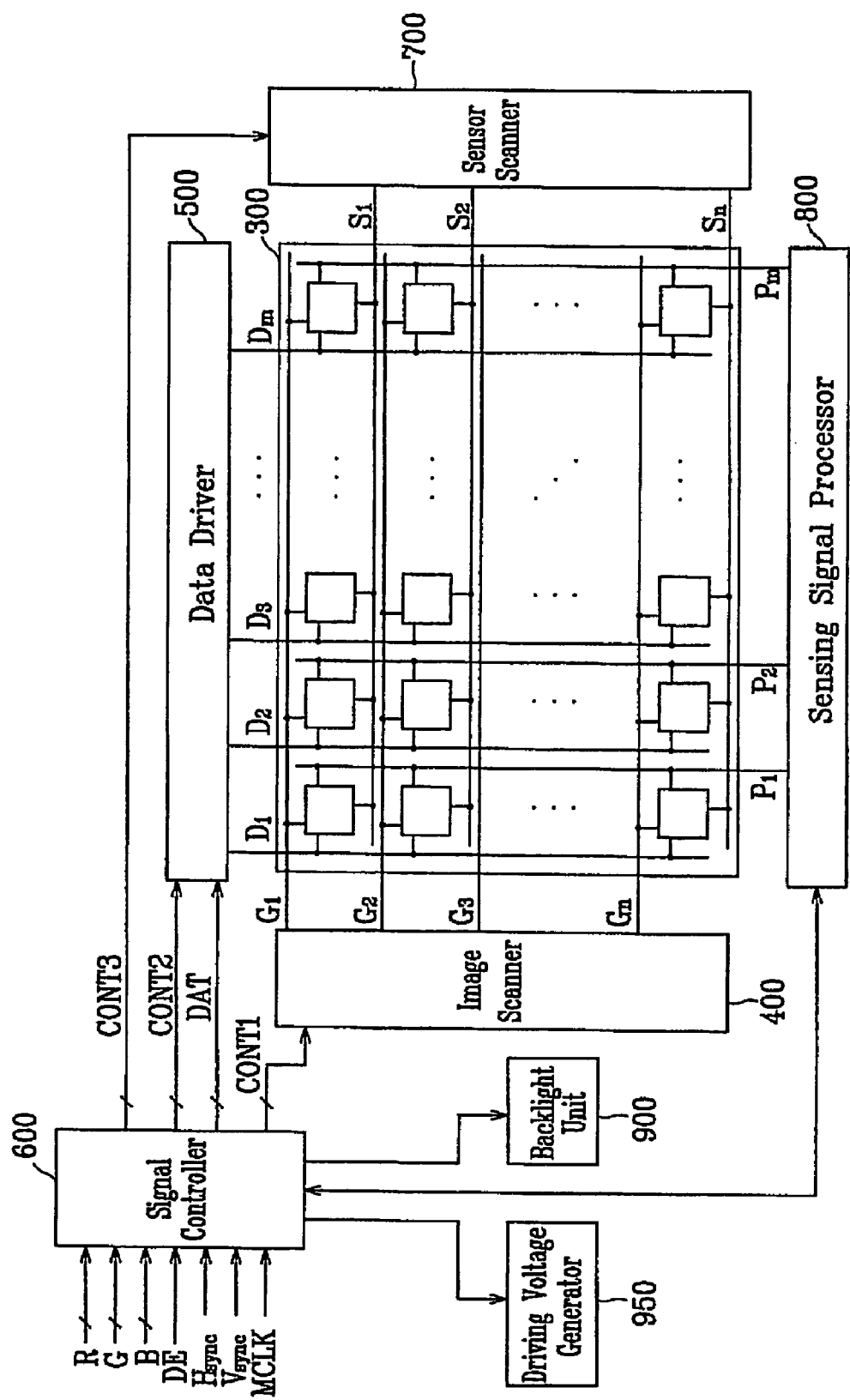
FIG. 1 is a block diagram of an LCD device according to an exemplary embodiment of the present invention.

The present invention now will be described more fully hereinafter with reference to the accompanying drawings, in which exemplary embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Figure 2:
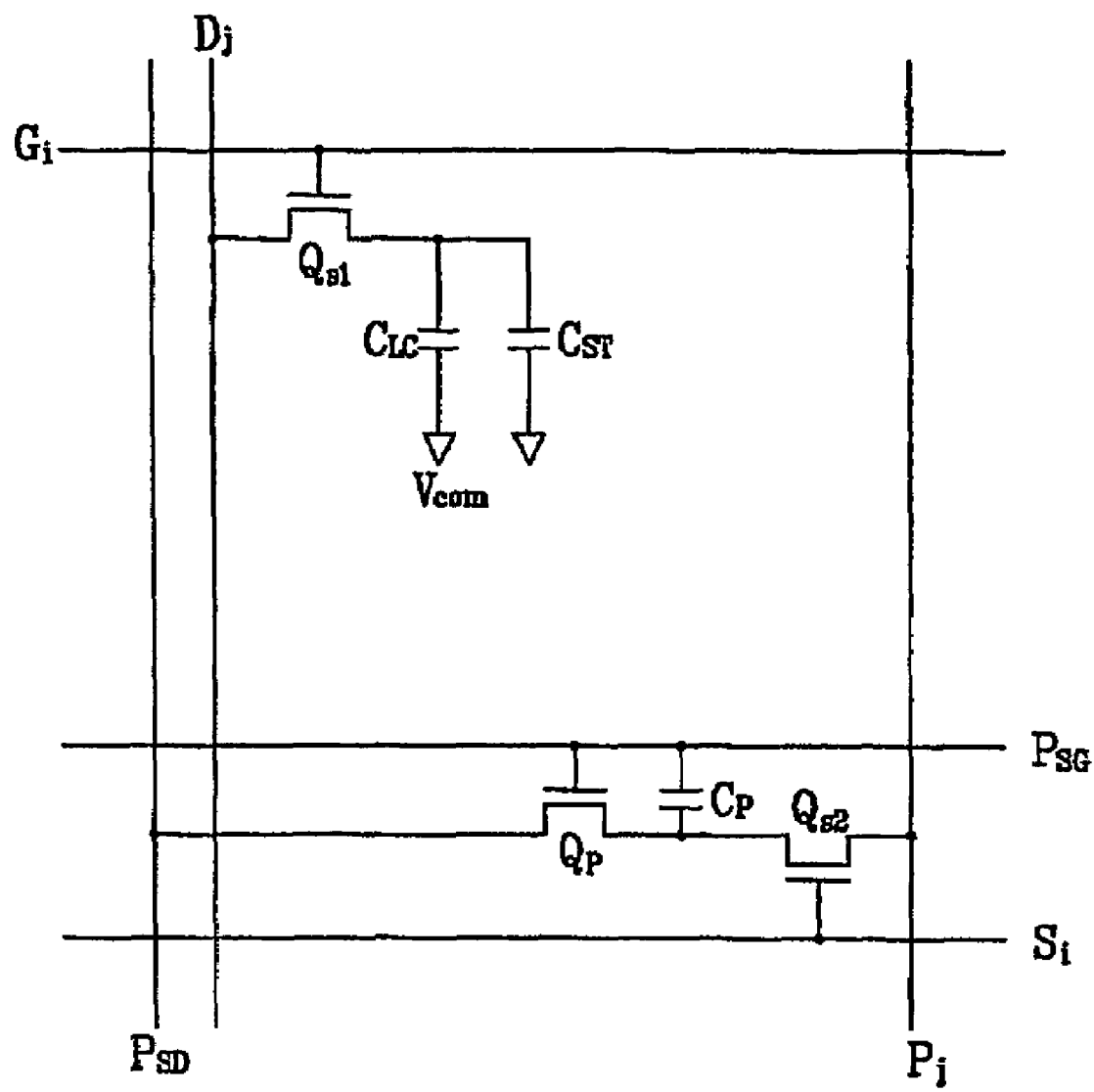
FIG. 2 is an equivalent circuit diagram of a subpixel of an LCD device according to an exemplary embodiment of the present invention.

FIG. 1 is a block diagram of a liquid crystal display (LCD) device according to an exemplary embodiment of the present invention, and FIG. 2 is an equivalent circuit diagram of a pixel of an LCD device according to an exemplary embodiment of the present invention.

Referring to FIGS. 1 and 2, an LCD device according to an exemplary embodiment of the present invention includes a liquid crystal (LC) panel assembly 300 and an image scanner 400, a data driver 500, a sensor scanner 700, and a sensing signal processor 800 connected to the LC panel assembly 300. The LCD device further includes a backlight unit 900 providing light to the LC panel assembly 300, a driving voltage generator 950 supplying voltages required by above-described elements and a signal controller 600 controlling the above-described elements.

The panel assembly 300 includes a plurality of signal lines $G_1$-$G_n$, $D_1$-$D_m$, $S_1$-$S_n$, $P_1$-$P_m$, $P_{SG}$ and $P_{SD}$ and a plurality of pixels electrically connected to the signal lines $G_1$-$G_n$, $D_1$-$D_m$, $S_1$-$S_n$, $P_1$-$P_m$, $P_{SG}$ and $P_{SD}$ and arranged substantially in a matrix.

The signal lines $G_1$-$G_n$, $D_1$-$D_m$, $S_1$-$S_n$, $P_1$-$P_m$, $P_{SG}$ and $P_{SD}$ include image scanning lines $G_1$-$G_n$ transmitting image scanning signals and data lines $D_1$-$D_m$ transmitting image data signals. The image scanning lines $G_1$-$G_n$ extend substantially in a row direction and are substantially parallel to each other, while the data lines $D_1$-$D_m$ extend substantially in a column direction and are substantially parallel to each other while being substantially perpendicular to the image scanning lines $G_1$-$G_n$.

The signal lines $G_1$-$G_n$, $D_1$-$D_m$, $S_1$-$S_n$, $P_1$-$P_m$, $P_{SG}$ and $P_{SD}$ further include sensing scanning lines $S_1$-$S_n$ transmitting sensing scanning signals and sensing signal lines $P_1$-$P_m$ transmitting sensing signals. The sensing scanning lines $S_1$-$S_n$ extend substantially in a row direction and are substantially parallel to each other, while the sensing signal lines $P_1$-$P_m$ extend substantially in a column direction and are substantially parallel to each other. The sensing scanning lines $S_1$-$S_n$ extend substantially parallel to the image scanning lines $G_1$-$G_n$, while the sensing signal lines $P_1$-$P_m$ extend substantially parallel to the data lines $D_1$-$D_m$.

The signal lines $G_1$-$G_n$, $D_1$-$D_m$, $S_1$-$S_n$, $P_1$-$P_m$, $P_{SG}$ and $P_{SD}$ also include a control voltage line $P_{SG}$ transmitting a control voltage $V_{SG}$ and an input voltage line $P_{SD}$ transmitting an input voltage $V_{SD}$. The control voltage line $P_{SG}$ extends substantially parallel to the image scanning lines $G_1$-$G_n$ and the sensing scanning lines $S_1$-$S_n$, while the input voltage line $P_{SD}$ extends substantially parallel to the data lines $D_1$-$D_m$ and the sensing signal lines $P_1$-$P_m$.

Each pixel includes a first switching element $Q_{S1}$ electrically connected to the image scanning and data lines $G_1$-$G_n$ and $D_1$-$D_m$, and an LC capacitor $C_{LC}$ and a storage capacitor $C_{ST}$ electrically connected to the first switching element $Q_{S1}$.

The first switching element $Q_{S1}$ such as, for example, a thin film transistor (TFT), has three terminals: a control terminal electrically connected to one of the image scanning lines $G_1$-$G_n$ (for example, $G_i$); an input terminal electrically connected to one of the data lines $D_1$-$D_m$ (for example, $D_j$); and an output terminal electrically connected to the LC capacitor $C_{LC}$ and the storage capacitor $C_{ST}$.

In addition, each pixel includes a photosensor, which includes a sensing element $Q_P$ electrically connected to control voltage and input voltage lines $P_{SG}$, $P_{SD}$, a second switching element $Q_{S2}$ electrically connected to the sensing scanning and sensing signal lines $S_1$-$S_n$, $P_1$-$P_m$ and a sensor signal capacitor $C_P$ electrically connected between the control voltage line $P_{SG}$ and a node between the second switching element $Q_{S2}$ and the sensing element $Q_P$. Alternatively, all the pixels do not necessarily include the photosensor, for example, one of the pixels may include the photosensor or, each pixel arranged at an interval of about 1 mm to about 2 mm may include the photosensor. In other words, a density of photosensors may be controlled, if necessary, and accordingly, a corresponding number of the sensing scanning lines $S_1$-$S_n$ and the sensing signal lines $P_1$-$P_m$ may also be controlled.

The sensing element $Q_P$ has three terminals: a control terminal and an input terminal electrically connected to the control voltage line $P_{SG}$ and input voltage line $P_{SD}$, respectively, and an output terminal electrically connected to the sensor signal capacitor $C_P$ and the second switching element $Q_{S2}$. The sensing element $Q_P$ generates a photocurrent which is responsive to illumination of light to a channel of the sensing element $Q_P$ comprised of amorphous silicon or polysilicon. The photocurrent flows toward the sensor signal capacitor $C_P$ and the second switching element $Q_{S2}$ driven by the input voltage $V_{SD}$ applied to the input voltage line $P_{SD}$.

The sensor signal capacitor $C_P$ is electrically connected between the sensing element $Q_P$ and the control voltage line $P_{SG}$, and stores a charge responsive to the photocurrent from the sensing element $Q_P$ to maintain a predetermined voltage. The sensor signal capacitor $C_P$ may be omitted if unnecessary.

The second switching element $Q_{S2}$ has three terminals: a control terminal, an output terminal and an input terminal electrically connected to one of the sensing scanning lines $S_1$-$S_n$ (for example, $S_i$), one of the sensing signal lines $P_1$-$P_m$ (for example, $P_i$) and the sensing element $Q_P$, respectively. The second switching element $Q_{S2}$ outputs a voltage stored by the sensor signal capacitor $C_P$ or the photocurrent from the sensing element $Q_P$ as sensing signals $V_{P1}$-$V_{PM}$ to the sensing signal lines $P_1$-$P_m$ when the sensing scanning lines $S_1$-$S_n$ receive a voltage for turning on the second switching element $Q_{S2}$.

In the exemplary embodiment described above, the first and second switching elements $Q_{S1}$ and $Q_{S2}$ and the sensing element $Q_P$ may contain amorphous silicon or poly-silicon TFTs.

The driving voltage generator 950 generates multiple voltages required by the LCD device, such as, for example, an image scanning on Voltage $V_{on}$ and an image scanning off voltage $V_{off}$ for turning on/off the first and second switching elements $Q_{S1}$ and $Q_{S2}$, respectively, and the input voltage $V_{SD}$ and the control voltage $V_{SG}$.

The image scanner 400 is electrically connected to the image scanning lines $G_1$-$G_n$ of the LC panel assembly 300 and synthesizes the image scanning on voltage $V_{on}$ and the image scanning off voltage $V_{off}$ from the driving voltage generator 950 to generate image scanning signals for application to the image scanning lines $G_1$-$G_n$.

The data driver 500 is electrically connected to the data lines $D_1$-$D_m$ of the LC panel assembly 300 and applies data voltages to the data lines $D_1$-$D_m$.

The sensor scanner 700 is electrically connected to the sensing scanning lines $S_1$-$S_n$ of the LC panel assembly 300 and synthesizes the image scanning on voltage $V_{on}$ and the image scanning off voltage $V_{off}$ from the driving voltage generator 950 and generates a sensing scanning signal for application to the sensing scanning lines $S_1$-$S_n$.

The sensing signal processor 800 is electrically connected to the sensing signal lines $P_1$-$P_m$ of the LC panel assembly 300 and receives the sensing signals $V_{P1}$-$V_{PM}$ outputted from the sensing signal lines $P_1$-$P_m$ to perform a predetermined signal processing.

The backlight unit 900 is disposed proximate to the LC panel assembly 300 to provide light to the LC panel assembly 300 and includes a plurality of lamps.

The signal controller 600 controls the image scanner 400, the data driver 500, the sensor scanner 700, the sensing signal processor 800, the backlight unit 900, and the driving voltage generator 950.

The image scanner 400, the data driver 500, the sensor scanner 700 or the sensing signal processor 800 may be directly mounted on the LC panel assembly 300 via driving integrated circuits or may be mounted on a flexible printed circuit film to be attached to the LC panel assembly 300 in a tape carrier package (TCP) type assembly. Alternatively, the image scanner 400, data driver 500, the sensor scanner 700 or the sensing signal processor 800 may be integrated in the LC panel assembly 300.

In addition, the image scanner 400, the data driver 500, the sensor scanner 700, the sensing signal processor 800 and the signal controller 600 may be implemented as a one-chip. The image scanner 400, data driver 500, the sensor scanner 700, the sensing signal processor 800 and signal controller 600 are integrated into the one-chip, thereby decreasing mounted space and reducing power consumption. Of course, if necessary, each element or circuits used in each element may be provided externally from the one-chip.

A display operation and photo sensing of the LCD device will now be described in detail.

The signal controller 600 is supplied with input image signals R, G and B and input control signals controlling a display of the LCD device. The input control signals include, for example, a vertical synchronization signal Vsync, a horizontal synchronization signal Hsync, a main clock MCLK, and a data enable signal DE. The input control signals are provided from an external graphic controller (not shown). After generating image scanning control signals CONT1 and data control signals CONT2 and processing the input image signals R, G and B suitable for operation of the LC panel assembly 300 responsive to the input control signals, the signal controller 600 provides the image scanning control signals CONT1 to the image scanner 400, and processed image signals DAT and the data control signals CONT2 to the data driver 500.

The image scanning control signals CONT1 include a vertical synchronization start signal STV for instructing the image scanner 400 of a scanning start of the image scanning on voltage $V_{on}$ and at least a clock signal for controlling an output of the image scanning on voltage $V_{on}$.

The data control signals CONT2 include a horizontal synchronization start signal STH for informing the data driver 500 of a start of a horizontal period, a load signal LOAD for instructing the data driver 500 to apply appropriate data voltages to the data lines $D_1$-$D_m$, an inversion control signal RVS for reversing a polarity of the data voltages with respect to a common voltage Vcom and a data clock signal HCLK.

The data driver 500 receives a packet of the processed image signals DAT for a pixel row from the signal controller 600 and converts the processed image signals DAT into analog data voltages in response to the data control signals CONT2 from the signal controller 600.

Responsive to the image scanning control signals CONT1 from the signal controller 600, the image scanner 400 applies the image scanning on voltage $V_{on}$ to the image scanning lines $G_1$-$G_n$, thereby turning on the first switching elements $Q_{S1}$ electrically connected to the image scanning lines $G_1$-$G_n$.

A difference between the data voltages and the common voltage $V_{com}$ applied to each pixel is expressed as a charged voltage of the LC capacitor $C_{LC}$, i.e., a pixel voltage. Liquid crystal molecules have orientations depending on a magnitude of the pixel voltage and the orientations determine a polarization of light passing through the pixel.

The data driver 500 applies the data voltages to corresponding data lines $D_1$-$D_m$ for a turn-on time of the first switching elements $Q_{S1}$ which is called "one horizontal period" or "1H" and equals one period of the horizontal synchronization signal Hsync and the data enable signal DE. Then, the data voltages are sequentially supplied to corresponding pixels via turned-on first switching elements $Q_{S1}$.

By repeating the above-described procedure, all image scanning lines $G_1$-$G_n$ are sequentially supplied with the image scanning on voltage $V_{on}$ during a frame, thereby applying the data voltages to all pixels. When a next frame starts after finishing one frame, the inversion control signal RVS applied to the data driver 500 is controlled such that the polarity of the data voltages is reversed (which is called "frame inversion"). The inversion control signal RVS may be also controlled such that the polarity of the data voltages flowing in a data line in one frame are reversed, e.g. column inversion, line inversion, or the polarity of the data voltages in one packet are reversed, e.g. column inversion, dot inversion.

The sensor scanner 700 sequentially applies the image scanning on voltage $V_{on}$ to the sensing scanning lines $S_1$-$S_n$ in response to the sensing control signal CONT3 from the signal controller 600, and the sensing signal processor 800 reads out the sensing signals $V_{P1}$-$V_{PM}$ applied to the sensing signal lines $P_1$-$P_m$. After magnifying and filtering read-out sensing signals $V_{P1}$-$V_{PM}$, the sensing signal processor 800 converts processed signals into digital signals for transmittance to the signal controller 600. The signal controller 600 determines a contact position and presence or absence of contact (e.g. touch location and touch or no touch) by processing the digital signals suitably and thereafter, the signal controller 600 transmits information regarding the contact position to an external device. The external device then transmits image signals based on the information to the LCD device.

A structure of the LCD device according to an exemplary embodiment of the present invention will now be described in detail with reference to FIGS. 3 to 5.

Figure 3:
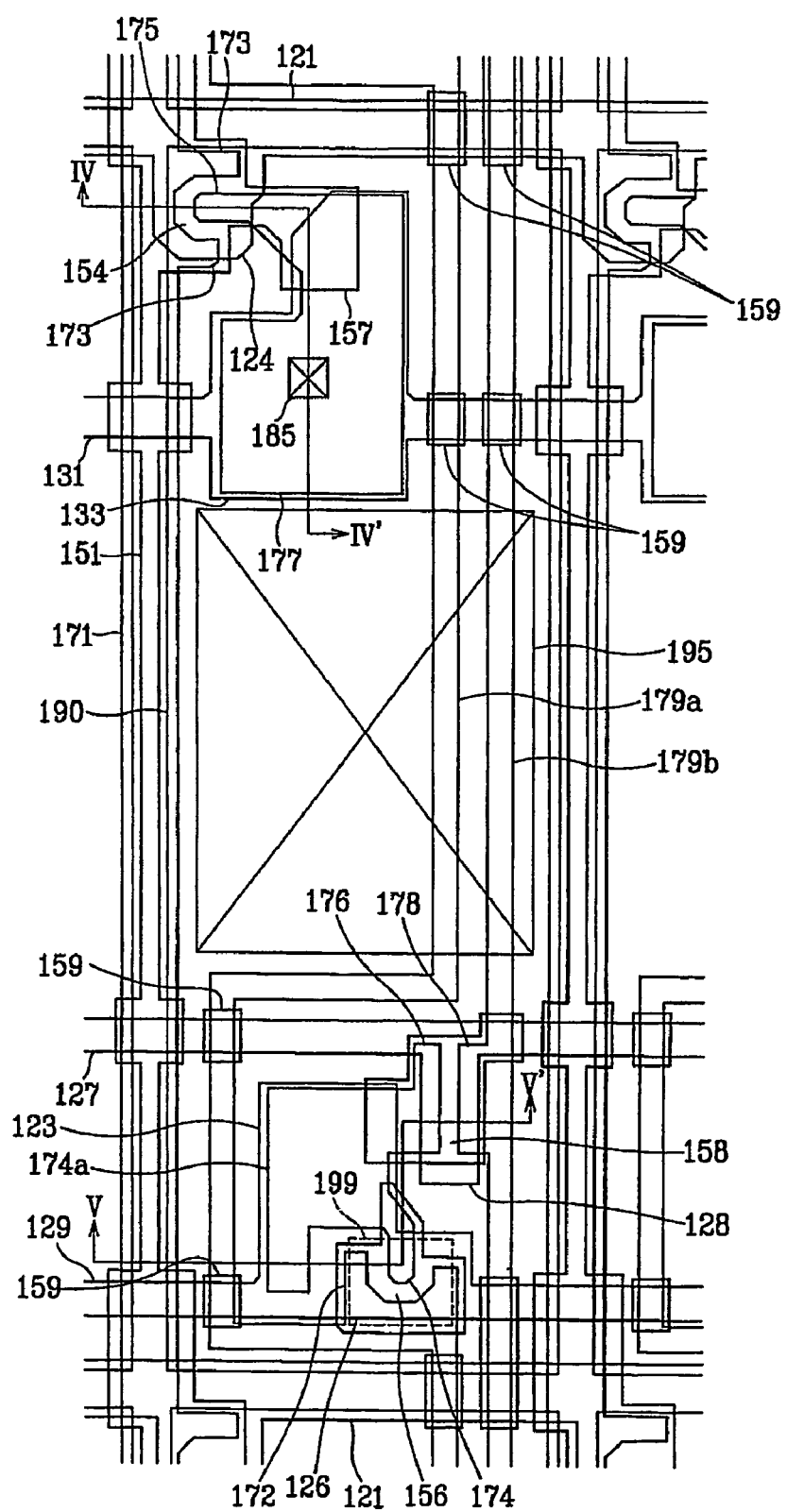
FIG. 3 is an exemplary layout view of an LCD device according to an exemplary embodiment of the present invention.
Figure 4:
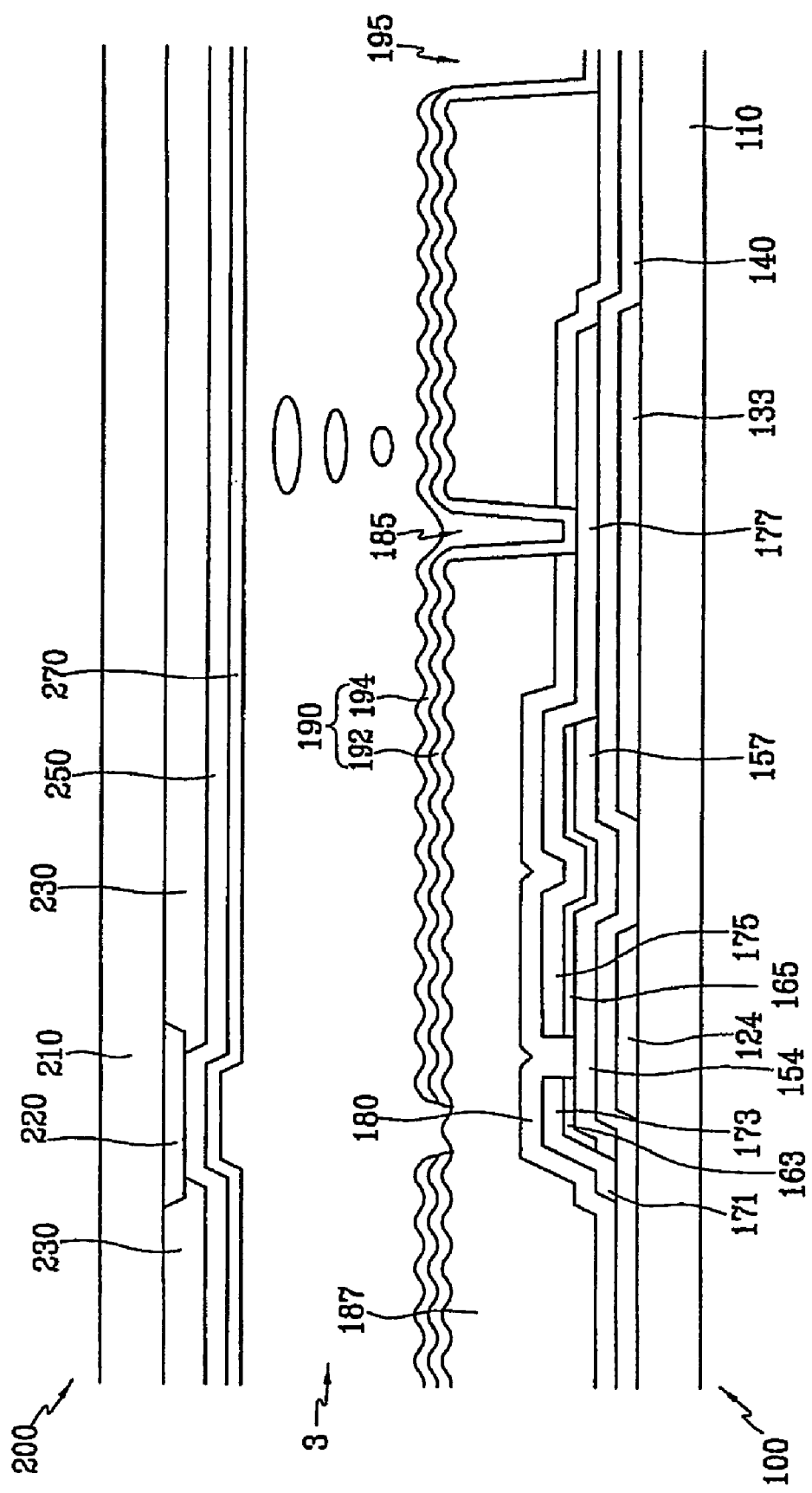

FIG. 3 is an exemplary layout view of an LCD device according to an exemplary embodiment of the present invention, and FIGS. 4 and 5 are sectional views taken along the lines IV-IV' and V-V' in FIG. 3, respectively.

An LCD device according to an exemplary embodiment of the present invention includes a TFT array panel 100, a common electrode panel 200, and a LC layer 3 interposed between the TFT array and common electrode panels 100 and 200.

The TFT array panel 100 will now be described in detail with reference FIGS. 3 to 5.

Image scanning lines 121, storage electrode lines 131, sensing scanning lines 127 and control voltage lines 129 are disposed on an insulating substrate 110 such as transparent glass.

The image scanning lines 121, the sensing scanning lines 127 and the control voltage lines 129 extend substantially in a transverse direction of the LCD device and are separated from each other and transmit image scanning signals, sensing scanning signals and control voltages $V_{SG}$, respectively, and include control electrodes 124, 128 and 126, respectively. The control voltage lines 129 include expansions 123 extending from the control electrodes 126.

Each storage electrode line 131 extends substantially in a transverse direction of the LCD device and includes a protrusion to form a storage electrode 133. The storage electrode lines 131 are supplied with a predetermined voltage such as a common voltage, which is applied to a common electrode 270 on the common electrode panel 200 of the LCD device.

The image and sensing scanning lines 121 and 127, the storage electrode lines 131 and the control voltage lines 129 are made of, for example, Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The image and sensing scanning lines 121 and 127, the storage electrode lines 131 and the control voltage lines 129 may have a multi-layered structure including two films having different physical characteristics. One of the two films is made of, for example, low resistivity metal including Al containing metal, Ag containing metal, or Cu containing metal for reducing signal delay or voltage drop in the image and sensing scanning lines 121 and 127, the storage electrode lines 131 and the control voltage lines 129. The other of the two films is made of, for example, a material such as Mo containing metal, Cr, Ta or Ti, which has good physical, chemical, and electrical contact characteristics with other materials such as indium tin oxide (ITO) or indium zinc oxide (IZO). Examples of combinations of the two films include a lower Cr film and an upper Al—Nd alloy film and a lower Al film and an upper Mo film.

In addition, lateral sides of the image and sensing scanning lines 121 and 127 and the storage electrode lines 131, and the control voltage lines 129 are inclined relative to a surface of the insulating substrate 110, and an inclination angle thereof ranges between about 30 degrees and about 80 degrees.

An insulating layer 140 made of, for example, silicon nitride SiNx, which is disposed on the image and sensing scanning lines 121 and 127, the storage electrode lines 131, the control voltage lines 129, the control electrodes 124, 128, and 126, the storage electrode, and exposed portions of the insulating substrate 110.

Semiconductor stripes 151 and semiconductor islands 156, 158 and 159 made of, for example, hydrogenated amorphous silicon abbreviated "a-Si" or polysilicon are disposed on selected portions of the insulating layer 140. Each semiconductor stripe 151 extends substantially in a longitudinal direction of the LCD device and has projections 154 branched out toward the control electrodes 124 and has expansions 157 extending therefrom. The semiconductor stripes 151 become wide near the image and sensing scanning lines 121 and 127, the storage electrode lines 131 and the control voltage lines 129 such that the semiconductor stripes 151 cover large areas of the image and sensing scanning lines 121 and 127, the storage electrode lines 131, and the control voltage lines 129.

Ohmic contact stripes 161 and ohmic contact islands 162, 164, 165, 166 and 168 made of, for example, silicide or n+ hydrogenated a-Si heavily doped with n type impurity such as phosphorous are disposed on the semiconductor stripes 151. Each ohmic contact stripe 161 has projections 163, and the projections 163 and the ohmic contact islands 165 are located in pairs on the projections 154 of the semiconductor stripes 151. In addition, the ohmic contact islands 162 and 164 and the ohmic contact islands 166 and 168 are located in pairs on the semiconductor islands 156 and 158, respectively.

Lateral sides of the semiconductor stripes 151 the semiconductor islands 156, 158 and 159, the ohmic contact stripes 161, and the ohmic contact islands 162, 164, 165, 166 and 168 are inclined relative to the surface of the insulating substrate 110, and inclination angles thereof are in a range, for example, from about 30 degrees to about 80 degrees.

Data lines 171, input voltage lines 179a and sensing signal lines 179b, output electrodes 174 and 175 and input electrode 176 are disposed on the ohmic contact stripes 161, the ohmic contact islands 162, 164, 165, 166 and 168 and the insulating layer 140.

The data lines 171, the input voltage lines 179a and sensing signal lines 179b extend substantially in the longitudinal direction and intersect the image and sensing scanning lines 121 and 127, the storage electrode lines 131, and the control voltage lines 129 and transmit the data voltages, the sensor input voltages and the sensing signals, respectively.

Each output electrode 175 includes an expansion 177 overlapping one storage electrode 133. Each longitudinal portion of the data lines 171 including projections forms an input electrode 173 facing an end portion of the output electrode 175. A control electrode 124, an input electrode 173, and an output electrode 175 along with a projection 154 of a semiconductor stripe 151 form a TFT having a channel disposed on the projection 154 between the input electrode 173 and the output electrode 175. Such a TFT functions as, for example, the first switching element $Q_{S1}$.

Each input voltage line 179a includes longitudinal portions and transverse portions, and a part of the transverse portions including projections forms an input electrode 172 facing an end portion of the output electrode 174. A control electrode 126, an input electrode 172, and an output electrode 174 along with a semiconductor island 156 form a TFT having a channel disposed on the semiconductor island 156 between the input electrode 172 and the output electrode 174. Such a TFT functions as the sensing element $Q_P$.

The output electrodes 174 of the sensing elements $Q_P$ and the input electrodes 176 of the second sensing elements $Q_{S2}$ are electrically connected to each other. The sensing signal lines 179b include output electrodes 178 projecting toward the input electrodes 176. Each pair of the input electrodes 176 and the output electrodes 178 are separated from each other and are disposed opposite each other with respect to the control electrode 128. A control electrode 128, an input electrode 176, and an output electrode 178 along with a semiconductor island 158 form a TFT having a channel disposed on the semiconductor island 158 between the input electrode 176 and the output electrode 178. Such a TFT functions as the second switching element $Q_{S2}$.

Each output electrode 174 has an expansion 174a overlapping the expansion 123 of each control voltage line 129, and the sensing signal capacitor $C_P$ is formed by overlapping the expansions 123 and 174a.

The data lines 171, the input voltage lines 179a, the sensing signal lines 179b, the output electrodes 174, 175 and 178, and the input electrodes 172, 173 and 176 are made of, for example, a refractory metal such as Cr, Mo, Ti, Ta or alloys thereof. However, they may also have a multilayered structure including a low-resistivity film (not shown) and a good-contact film (not shown). Examples of combinations of the multilayered structure include a lower Mo film, an intermediate Al film, and an upper Mo film as well as the above-described combinations of a lower Cr film and an upper Al—Nd alloy film and a lower Al film and an upper Mo film.

Like the image and sensing scanning lines 121 and 127, the storage electrode lines 131 and the control voltage lines 129, the data lines 171, the input voltage lines 179a, the sensing signal lines 179b, the output electrodes 174, 175 and 178 and the input electrodes 172, 173 and 176 have tapered lateral sides, and inclination angles thereof range from about 30 degrees to about 80 degrees.

The ohmic contact stripes 161 and the ohmic contact islands 162, 164, 165, 166 and 168 are interposed between underlying semiconductor stripes 151 and semiconductor islands 156, 158 and 159 and overlying data lines 171, input voltage lines 179a, sensing signal lines 179b, output electrodes 174, 175 and 178, and input electrodes 172, 173 and 176 to reduce a contact resistance therebetween. The semiconductor stripes 151 include exposed portions, which are not covered with the data lines 171 and the output electrodes 175, such as portions located between the input electrodes 173 and the output electrodes 175. Although the semiconductor stripes 151 are narrower than the data lines 171 at most places, the width of the semiconductor stripes 151 becomes large near the image and sensing scanning lines 121 and 127, the storage electrode lines 131 and the control voltage lines 129 as described above, to provide a smooth surface profile, thereby preventing disconnection of the data lines 171.

A passivation layer 180 is disposed on the data lines 171, the input voltage lines 179a, the sensing signal lines 179b, the output electrodes 174, 175 and 178, and the input electrodes 172, 173 and 176 and exposed portions of the semiconductor stripes 151. An organic insulating layer 187 is disposed on the passivation layer. The passivation layer 180 is made of, for example, an inorganic insulator such as silicon nitride or silicon oxide, and the organic insulating layer 187 is made of, for example, a photosensitive organic material having a good flatness characteristic. In this case, a surface of the organic insulating layer 187 has a pattern of alternating protrusions and depressions, which is also included on a reflective electrode 194 to maximize a reflective efficiency.

The passivation layer 180 and the organic insulating layer 187 have contact holes 185 exposing the expansions 177 of the output electrodes 175. The contact holes 185 may have a polygonal or a circle shape. Lateral sides of the contact holes 185 have inclination angles that range, for example, from about 30 degrees to about 85 degrees or have a step form.

Pixel electrodes 190 are disposed on the organic insulating layer 187. The pixel electrodes 190 include transparent electrodes 192 and reflective electrodes 194. The transparent electrodes 192 are made of, for example, a transparent conductor such as ITO or IZO, and the reflective electrodes 194 are made of, for example, an opaque and reflective conductor such as Ag or Ag alloy, or Al or Al alloy. The pixel electrodes 190 may further include contact assistants (not shown), which are made of, for example, Mo or Mo alloy, Cr, Ti or Ta. The contact assistants assure a contact characteristic of the transparent electrodes 192 and the reflective electrodes 194 and prevent the transparent electrodes 192 from oxidizing the reflective electrodes 194.

Each pixel has a transmissive area 195 and a reflective area RA. The transmissive area 195 is an area at which the reflective layer 194 is omitted and the reflective area RA is an area at which the reflective layer 194 is present. The transmissive area 195 and the reflective area RA are different in a cell gap due to removal of the organic insulating layer 187 in the transmissive area 195.

Apertures 199, which expose the semiconductor islands 156 to ambient light due to removal of the organic insulating layer 187 and the pixel electrodes 190, are disposed on the semiconductor islands 156.

The pixel electrodes 190 are physically and electrically connected to the expansions 177 of the output electrodes 175 through the contact holes 185 such that the pixel electrodes 190 receive the data voltages from the output electrodes 175. The pixel electrodes 190 supplied with the data voltages generate electric fields in cooperation with the common electrode 270, which determine the orientations of liquid crystal molecules in the liquid crystal layer 3.

As described above, the pixel electrode 190 and the common electrode 270 form the LC capacitor $C_{LC}$, which stores applied voltages after turn-off of the TFT. Additionally, a storage capacitor $C_{ST}$, which is electrically connected in parallel with the LC capacitor $C_{LC}$, is provided for enhancing a voltage storing capacity. The storage capacitor $C_{ST}$ is implemented by overlapping the expansions 177 of the output electrodes 175 with the storage electrode lines 131. Alternatively, the storage capacitor $C_{ST}$ may be implemented by overlapping the pixel electrode 190 with the image scanning signal line 121 adjacent thereto, and then the storage electrode lines 131 may be omitted. In an exemplary embodiment, the pixel electrodes 190 overlap the scanning lines 121 and adjacent data lines 171 to increase an aperture ratio.

A description of the common electrode panel 200 follows with reference to FIGS. 3-5.

The common electrode panel 200 includes an insulating substrate 210, a light blocking member 220, color filters 230, an overcoat 250, and the common electrode 270. The light blocking member 220, called a black matrix for preventing light leakage, is disposed on the insulating substrate 210, which may be, for example, transparent glass. The light blocking member 220 may include openings that face the pixel electrodes 190 and may have substantially a same planar shape as the pixel electrodes 190. Alternatively, the light blocking member 220 may include linear portions corresponding to the data lines 171 and other portions corresponding to the TFTs.

The color filters 230 are disposed on the insulating substrate 210 and are disposed substantially in areas enclosed by the light blocking member 220. The color filters 230 may extend substantially along the longitudinal direction along the pixel electrodes 190. The color filters 230 may represent one of primary colors such as red, green and blue colors.

The overcoat 250 for preventing the color filters 230 from being exposed and for providing a flat surface is disposed on the color filters 230 and the light blocking member 220. The common electrode 270 made of, for example, a transparent conductive material such as ITO and IZO is disposed on the overcoat 250.

A pair of polarizers (not shown) polarizing light are attached on outer surfaces of the TFT array and common electrode panels 100 and 200 of the LC panel assembly 300.

An LCD device according to an exemplary embodiment of the present invention includes a photosensor sensing ambient light and/or light from a backlight unit in order to control a sensing signal of the photosensor in the pixel. A first reference photosensor PSA and a second reference photosensor PSB will now be described in detail with reference to FIGS. 6A to 8.

Figure 6A:
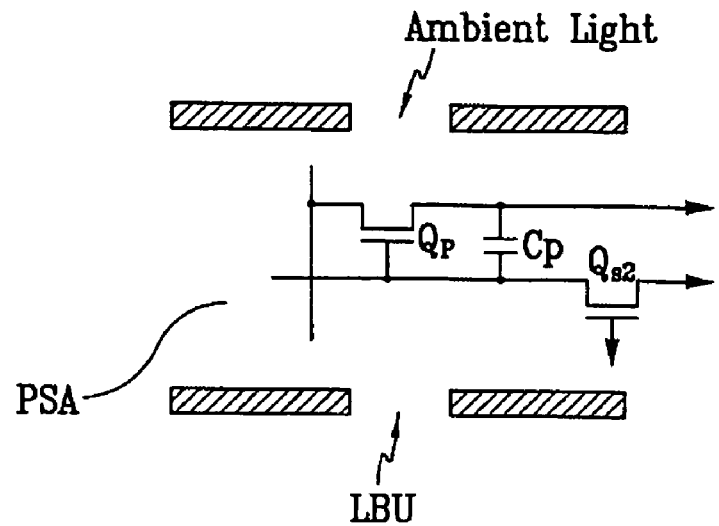
FIGS. 6A and 6B are each schematic views of a reference photosensor of an LCD device according to an exemplary embodiment of the present invention.
Figure 6B:
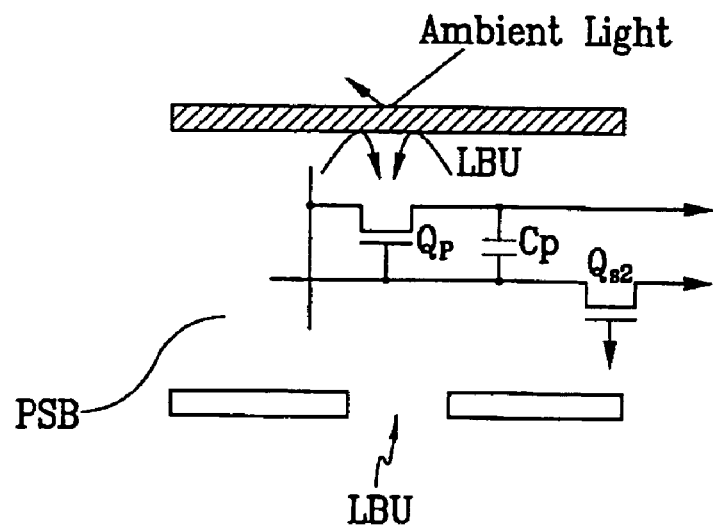
Figure 7:
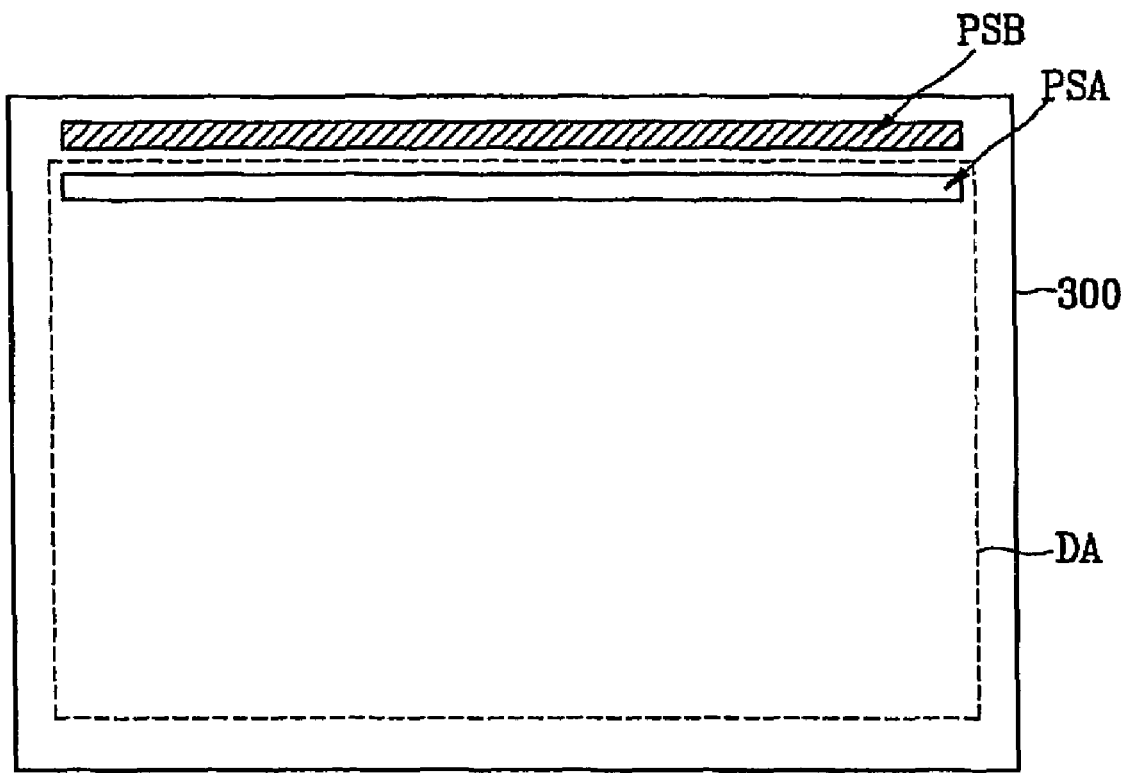
FIG. 7 is a schematic view of photosensor positions mounted on an LC panel assembly of an LCD device according to an exemplary embodiment of the present invention.
Figure 8:
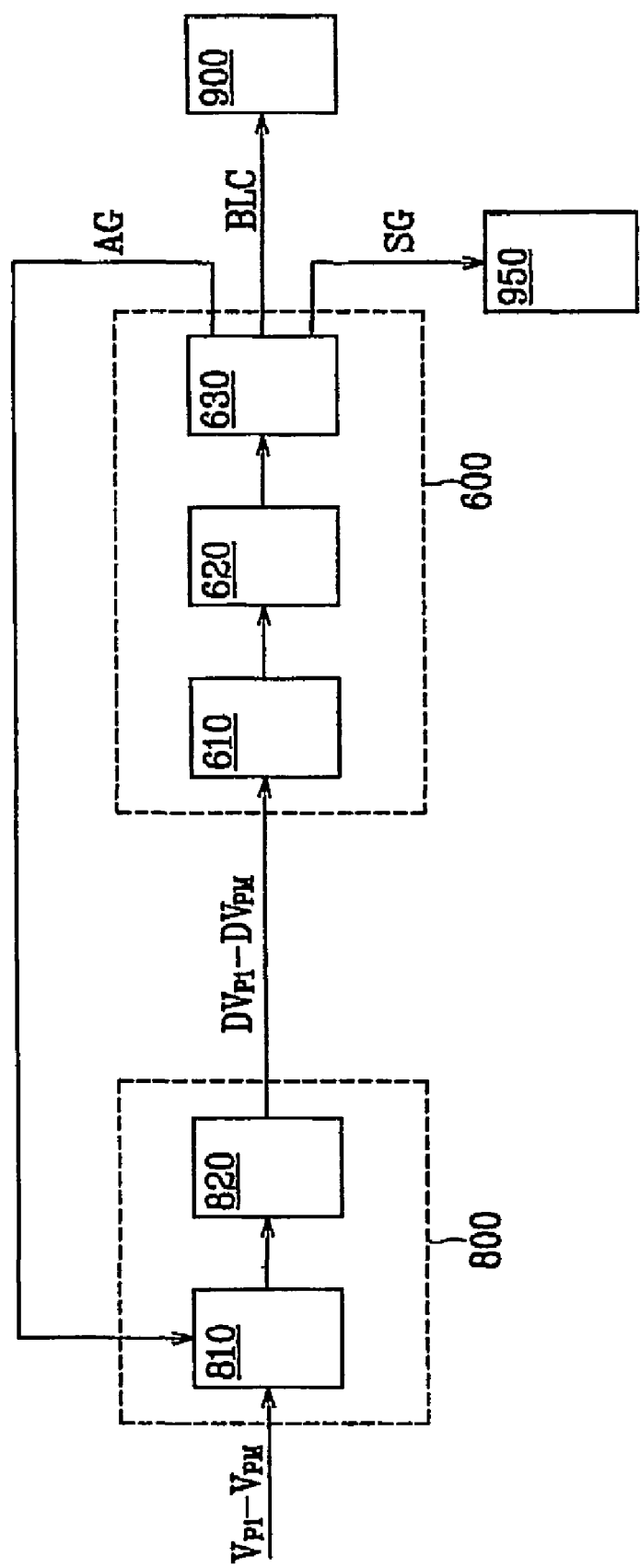
FIG. 8 is a block diagram of a signal reader and a signal controller of an LCD device according to an exemplary embodiment of the present invention.

FIGS. 6A and 6B are schematic views of the first and second reference photosensors PSA and PSB according to an exemplary embodiment of the present invention. FIG. 7 is a schematic view of mounted positions of the first and second reference photosensors PSA and PSB on an LC panel assembly 300 of an LCD device according to an exemplary embodiment of the present invention. FIG. 8 is a block diagram of a signal reader and a signal controller of an LCD device according to an exemplary embodiment of the present invention.

The first reference photosensor PSA is a photosensor disposed in a display area DA that is electrically connected to sensing scanning lines and includes the sensing element $Q_P$, the switching element $Q_{S2}$ and the sensor signal capacitor $C_P$ described above with reference to FIG. 2, as shown in FIG. 6A. The first reference photosensor PSA is disposed along an edge of the display area DA displaying images in the LC panel assembly 300. The first reference photosensor PSA is also disposed substantially parallel to a longitudinal length of the LC panel assembly 300. However, if necessary, the reference photosensor PSA may be disposed exterior to the display area DA and may be provided separate from a photosensor in the display area DA (referred to hereinafter as "PSDA"). Disposing the first reference photosensor at the edge of the display area DA of the LC panel assembly 300 reduces affects of shadows etc. caused by a touch.

The second reference photosensor PSB includes the sensing element $Q_P$, the switching element $Q_{S2}$ and the sensor signal capacitor $C_P$ as shown in FIG. 6B. The second reference photosensor PSB is disposed outside of the display area DA, as shown in FIG. 7, and connected to separate sensing scanning lines. The second reference photosensor PSB is disposed proximate to the edge of the display area at which the first reference photosensor PSA is disposed. The second reference photosensor PSB is disposed substantially parallel to the first reference photosensor PSA.

When a display area is viewed from a front view, the first and second reference photosensors PSA and PSB may be disposed proximate to either an upper edge or a lower edge of the LC panel assembly 300, and in either case, the first reference photosensor PSA is connected to selected sensing scanning lines and the second reference photosensor PSB is disposed outside of the display area DA proximate to the first reference photosensor PSA.

The first reference photosensor PSA receives ambient light via openings of the sensing element $Q_P$ and receives light from the backlight unit 900 (referred to hereinafter as "LBU") via a back side or aperture near the sensing element $Q_P$. In addition, the first reference photosensor PSA receives LBU guided by a layer forming the first reference photosensor PSA or by a layer either internal or external to the first reference photosensor PSA and a material layer around the layer. The first reference photosensor PSA generates sensing signals responsive to illumination of the ambient light and the LBU.

The second reference photosensor PSB represents an alternative arrangement for a photosensor to that of the first reference photosensor PSA. The second reference photosensor PSB blocks the sensing element $Q_P$ from ambient light since the sensing element $Q_P$ is shielded from the ambient light by the light blocking member 220 and/or the reflective electrode 194. However, the second reference photosensor PSB receives the LBU via the back side or the aperture near the sensing element $Q_P$ or, as described above, via the guided LBU. In addition, the second reference photosensor PSB receives more of the LBU reflected by the reflective electrode 194 relative to the first reference photosensor PSA. The second reference photosensor PSB generates sensing signals responsive to illumination of the LBU.

The LCD device according to an exemplary embodiment of the present invention may include a plurality of the first and second reference photosensors PSA and PSB, and, like the PSDA, the first and second reference photosensors PSA and PSB are connected to the sensing signal lines $P_1$-$P_m$ to output the sensing signals $V_{P1}$-$V_{PM}$ to the sensing signal lines $P_1$-$P_m$ responsive to the sensing scanning signal.

An LCD device processing the sensing signal from the first and second reference photosensors PSA and PSB will now be described with reference to FIGS. 8 and 9.

Figure 9:
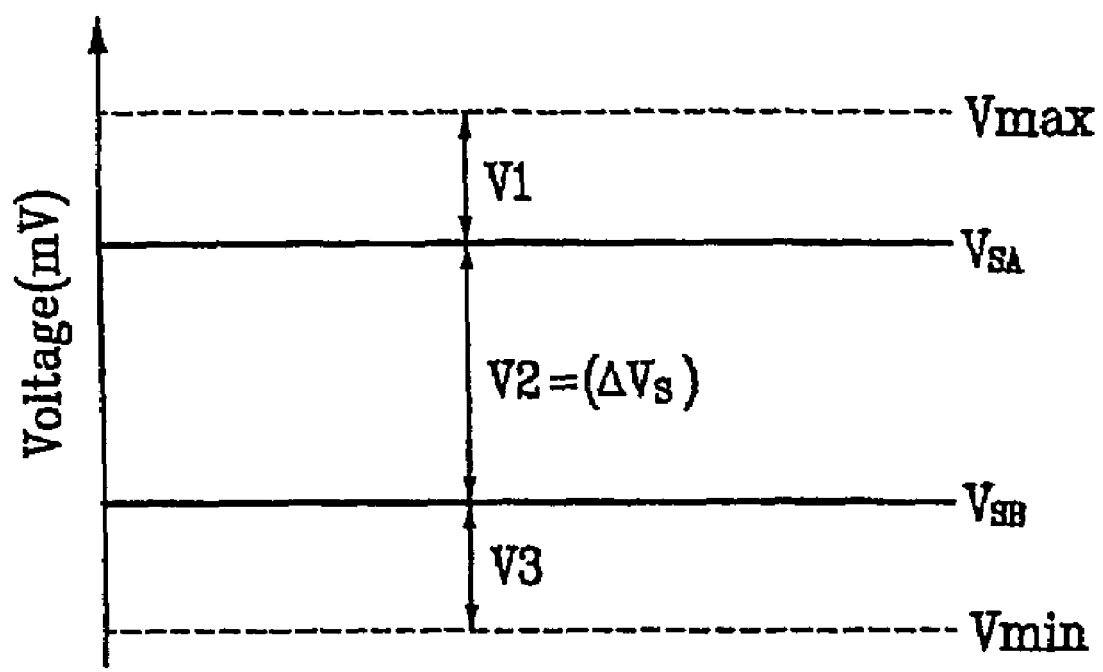
FIG. 9 illustrates sensing signals of the reference photosensors shown in FIGS. 6A and 6B.

FIG. 8 is a block diagram of a signal reader and a signal controller of an LCD device according to an exemplary embodiment of the present invention, and FIG. 9 illustrates sensing signals of the first and second reference photosensors PSA and PSB shown in FIGS. 6A and 6B, respectively.

As shown in FIG. 8, the LCD device includes a sensing signal processor 800, a signal controller 600, a backlight unit 900 and a driving voltage generator 950.

The sensing signal processor 800 includes a sensing signal regulator 810 and an analog to digital converter 820. The sensing signal regulator 810 receives the respective sensing signals $V_{P1}$-$V_{PM}$ from the first and second reference photosensors PSA and PSB via the sensing signal lines $P_1$-$P_m$ for magnifying and/or filtering. The analog to digital converter 820 converts regulated sensing signals $V_{P1}'$-$V_{PM}'$ into digital signals.

The signal controller 600 includes a signal input unit 610, an operation unit 620 and a control signal output unit 630 connected in series, which may be implemented by digital logics.

The signal input unit 610 processes digital-converted sensing signal $DV_{P1}$-$DV_{PM}$ from the analog to digital converter 820. In other words, the signal input unit 610 seeks an average of the digital-converted sensing signals $DV_{P1}$-$DV_{PM}$ of the first reference photosensor PSA to generate a first average sensing signal $V_{SA}$ and seeks an average of the digital-converted sensing signals $DV_{P1}$-$DV_{PM}$ of the second reference photosensor PSB to generate a second average sensing signal $V_{SB}$. In addition, the signal input unit 610 may perform a digital-filtering. As described above, use of the first and second average sensing signals $V_{SA}$ and $V_{SB}$ for multiple first and second reference photosensors PSA and PSB prevents non-uniformity of sensing signals relative to sensing signals generated for a single first and second reference photosensor PSA and PSB.

The operation unit 620 generates first to third state judgment signals V1, V2 and V3 responsive to the first and second average sensing signals $V_{SA}$ and $V_{SB}$ from the signal input unit 610. As shown in FIG. 9, the first state judgment signal V1 is defined by subtracting the first average sensing signal $V_{SA}$ from a maximum signal Vmax, and the second state judgment signal V2 is defined by a difference value between the first average sensing signal $V_{SA}$ and the second average sensing signal $V_{SB}$, and the third state judgment signal V3 is defined by subtracting a minimum signal Vmin from the second average sensing signal $V_{SB}$. The maximum signal Vmax and the minimum signal Vmin are determined by the sensing signal regulator 810 and the analog to digital converter 820 and, for example, values of the maximum and minimum signals Vmax and Vmin are allowed to be inputted into the operation unit 620.

The first state judgment signal V1 is dependent on an intensity of ambient light and a luminance of lamps and a value of the first state judgment signal V1 becomes smaller as the intensity of the ambient light becomes larger. The second state judgment signal V2 is dependent on the intensity of the ambient light and the luminance of the lamps and a value of the second state judgment signal V2 becomes larger as the intensity of the ambient light becomes larger. The third state judgment signal V3 becomes larger as the luminance of the lamps becomes larger.

The operation unit 620 determines a sensing state responsive to the intensity of the ambient light of the LCD device based on the first to third state judgment signals V1, V2 and V3. In other words, the operation unit 620 can determine whether the LCD device lies outdoors or indoors, or whether, though indoors, it is bright or dark, by comparison of the first to third state judgment signals V1, V2 and V3 with predetermined set values. The sensing state may be determined as one of two possible states or more than two if necessary, and such examples of a state judgment will be described with reference to FIGS. 10 and 11.

Figure 10:
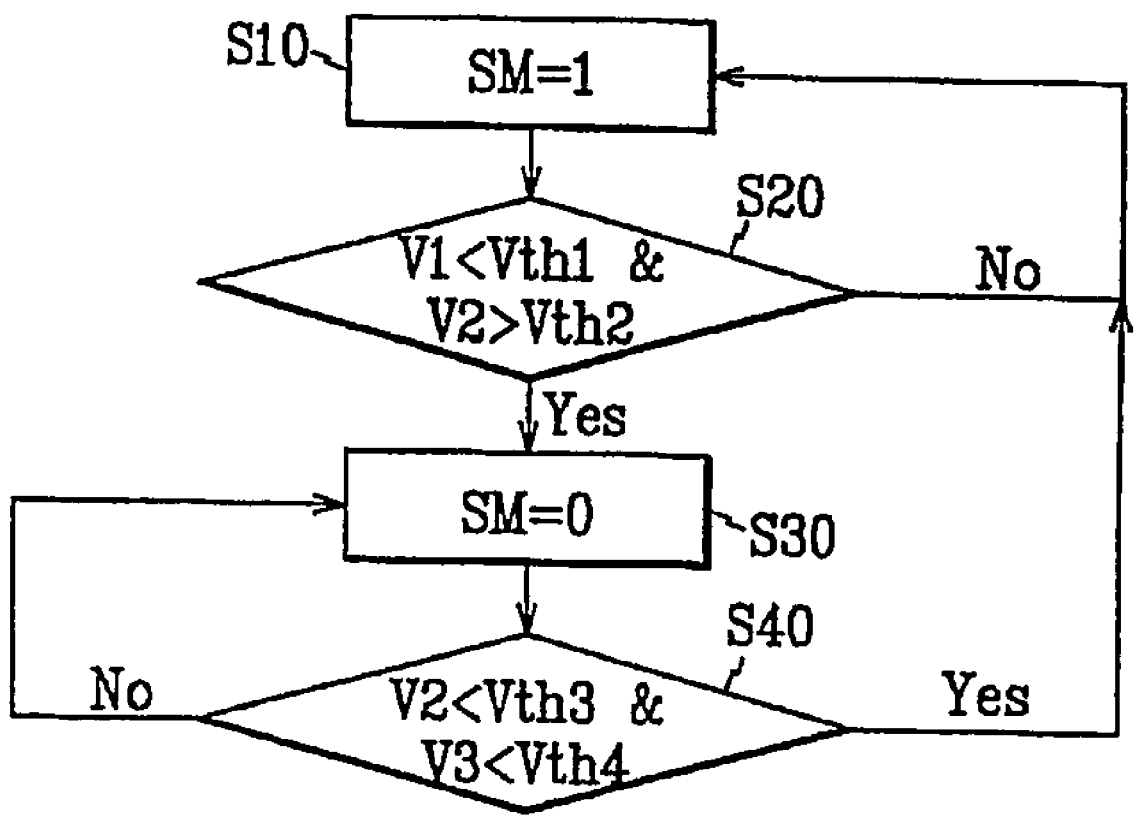
FIG. 10 is an exemplary flow chart for determining a sensing state of an LCD device according to an exemplary embodiment of the present invention.
Figure 11:
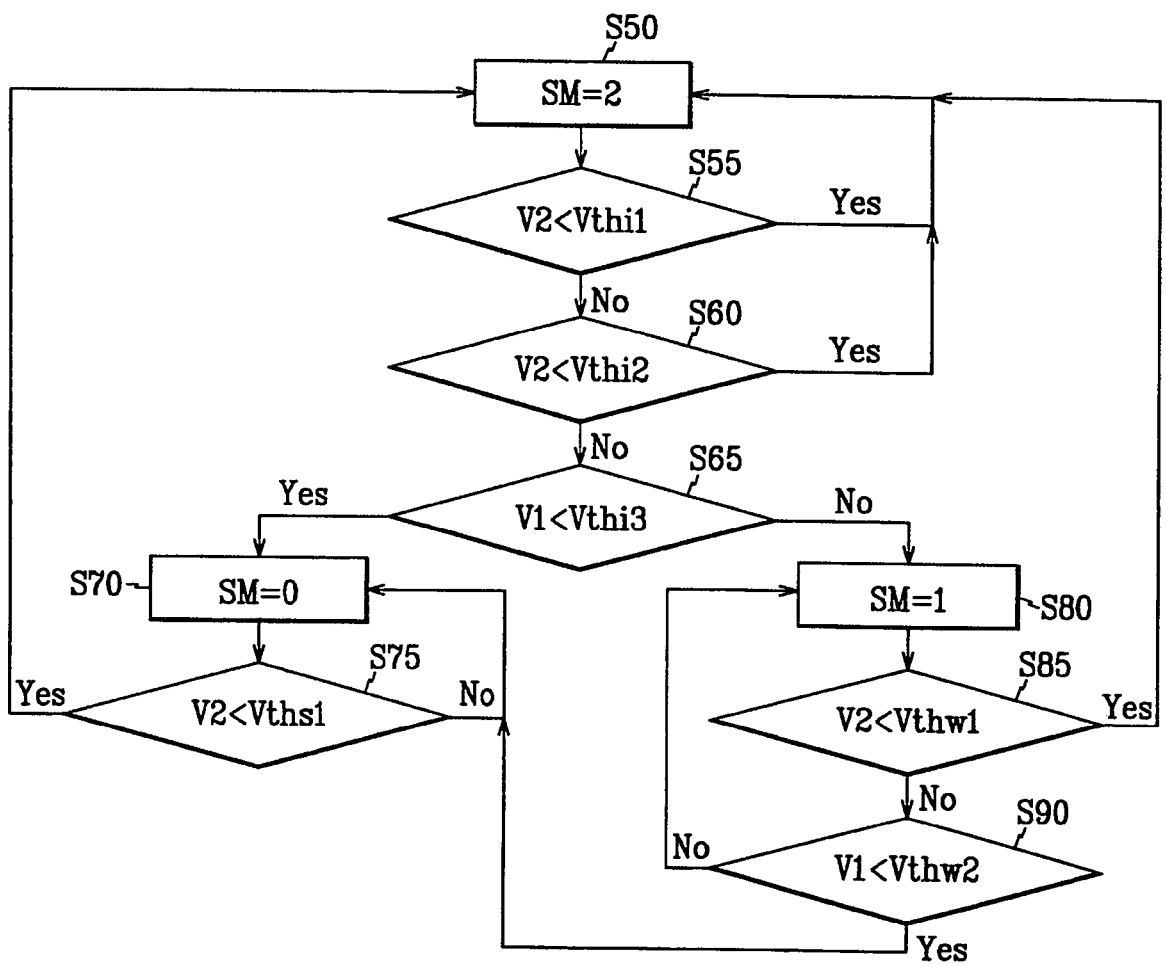
FIG. 11 is another exemplary flow chart for determining a sensing state of an LCD device according to an exemplary embodiment of the present invention.

FIG. 10 is an exemplary flow chart for judging a sensing state of an LCD device according to an exemplary embodiment of the present invention, and FIG. 11 is another exemplary flow chart for judging a sensing state of an LCD device according to an exemplary embodiment of the present invention.

In the flow chart in FIG. 10, the operation unit 620 determines a sensing state SM from among two possible states represented as 0 and 1.

First, the operation unit 620 initializes the sensing state SM as "1" (S10), and, subsequently, compares the first state judgment signal V1 with a first predetermined value Vth1 and compares the second state judgment signal V2 with a second predetermined value Vth2 (S20). As a result of comparison, in response to the first state judgment signal V1 being smaller than the first predetermined value Vth1 and the second state judgment signal V2 being larger than the second predetermined value Vth2, the operation unit 620 changes the sensing state SM to "0" (S30), and otherwise maintains the sensing state SM as "1".

When the sensing state SM is "0", the operation unit 620 compares the second state judgment signal V2 with a third predetermined value Vth3 and compares the third state judgment signal V3 with a fourth predetermined value Vth4 (S40). As a result of comparison, in response to the second state judgment signal V2 being smaller than the third predetermined value Vth3 and the third state judgment signal V3 being smaller than the fourth predetermined value Vth4, the sensing state SM is changed into "1" (S10), otherwise, the sensing state SM is maintained as "0".

In the above-described case, when the sensing state SM is "1," the intensity of the ambient light is small or a difference between the ambient light and the LBU is small, which corresponds, for example, to an indoor luminance. When the sensing state SM is "0," the intensity of the ambient light is large or the difference between the ambient light and the LBU is large, which corresponds, for example, to outdoor luminance.

The operation unit 620 sends the judged result of the sensing state SM to the control signal output unit 630. The control signal output unit 630 controls the backlight unit 900, the driving voltage generator 950 and the sensing signal regulator 810 responsive to the sensing state SM.

For example, the control signal output unit 630 transmits a backlight control signal BLC to the backlight unit 900 for control of the luminance of the lamps of the backlight unit 900. Thus, for example, for the sensing state SM of "0," the backlight unit 900 is turned off, and for the sensing state SM of "1," the backlight unit 900 is turned on.

In addition, the control signal output unit 630 transmits a gain control signal AG to the sensing signal regulator 810 to control of a gain of the sensing signal regulator 810. Accordingly, magnitudes of the sensing signals $V_{P1}$-$V_{PM}$ from the first and second reference photosensors PSA and PSB and the PSDA are regulated to be transmitted to the analogue to digital converter 820.

The control signal output unit 630 transmits a voltage control signal SG to the driving voltage generator 950, thereby changing a level of the control voltage $V_{SG}$. A change of the level of the control voltage $V_{SG}$ changes the magnitudes of the sensing signals $V_{P1}$-$V_{PM}$ from the first and second reference photosensors PSA and PSB and the PSDA.

Thus, contact information responsive to a touch can be determined accurately by receiving the sensing signals $V_{P1}$-$V_{PM}$ with suitable magnitudes due to control of the backlight unit 900, the driving voltage generator 950 and the sensing signal regulator 810 responsive to the sensing state SM.

Alternatively, in the flow chart in FIG. 11, the operation unit 620 determines the sensing state SM from among three possibilities such as "0", "1" and "2".

First, the operation unit 620 initializes the sensing state SM as "2" (S50). Then, the operation unit 620 compares the second state judgment signal V2 with a first predetermined value Vthi1 to maintain the sensing state SM as "2" in response to the second state judgment signal V2 being smaller than the first predetermined value Vthi1. In response to the second state judgment signal V2 being larger than the first predetermined value Vthi1, the operation unit 620 compares the second state judgment signal V2 with a second predetermined value Vthi2 (S60). As a result of comparison at operation (S60), in response to the second state judgment signal V2 being smaller than the second predetermined value Vthi2, the operation unit 620 maintains the sensing state SM as "2." In response to the second state judgment signal V2 being larger than the second predetermined value Vthi2, the operation unit 620 compares the first state judgment signal V1 with a third predetermined value Vthi3 (S65). As a result of comparison at operation (S65), in response to the first state judgment signal V1 being smaller than the third predetermined value Vthi3, the operation unit 620 changes the sensing state SM into "0" (S70). In response to the first state judgment signal V1 being larger than the third predetermined value Vthi3, the operation unit 620 changes the sensing state SM into "1" (S80).

When the sensing state is "0," the second state judgment signal V2 is compared with a value Vths1 (S75). The sensing state SM is changed into "2" in response to the second state judgment signal V2 being smaller than the value Vths1, and the sensing state SM is maintained as "0" in response to the second state judgment signal V2 being larger than the value Vths1.

When the sensing state is "1," the second state judgment signal V2 is compared with a value Vthw1 (S85), the sensing state SM is changed into "2" in response to the second state judgment signal V2 being smaller than the value Vthw1, and the first state judgment signal V1 is compared with a value Vthw2 in response to the second state judgment signal V2 being larger than the value Vthw1 (S90). As a result of comparison at operation S90, in response to the first state judgment signal V1 being smaller than the value Vthw2, the sensing state SM is changed into "0", and the sensing state SM is maintained as "1" in response to the first state judgment signal V1 being larger than the value Vthw2.

In such an example as described above, the sensing state SM of "0" may correspond, for example, to the outdoor luminance, and the sensing state SM of "1" may correspond, for example, to a luminance in a bright room, and the sensing state SM of "2" may correspond, for example, to a luminance in a dark room.

In both a two sensing state SM and a three sensing state SM example, the control signal output unit 630 controls the backlight unit 900, the driving voltage generator 950 and the sensing signal regulator 810 responsive to the sensing signal SM. For example, when ambient light is plentiful, the control voltage $V_{SG}$ is lowered or the gain of the sensing signal regulator 810 is lowered. However, in the three sensing state example, a dimming control for controlling the luminance of the lamps of the backlight unit 900 may be performed, and the control voltage $V_{SG}$ of the driving voltage generator 950 and the gain of the sensing signal regulator 810 can be controlled in greater detail.

Alternatively, the operation unit 620 may be configured to determine the sensing state SM for 4 or more than 4 possible states and may judge the sensing state SM responsive to the state judgment signals V1, V2 and V3.

The LCD device according to an exemplary embodiment of the present invention may further include a photosensor (not shown) having a same structure as the PSDA and blocked from all of the ambient light and the LBU. Such a sensor outputs a sensing signal responsive to temperature only, and the PSDA can perform more stable photo-sensing by considering affects of temperature by determining the sensing state SM including such a temperature sensitive sensing signal.

An LCD device, which can acquire optimal sensing signals from the PSDA corresponding to variation of the ambient light using the first and second reference photosensors PSA and PSB, will now be described with reference to FIGS. 12 and 13 with FIG. 8.

Figure 12:
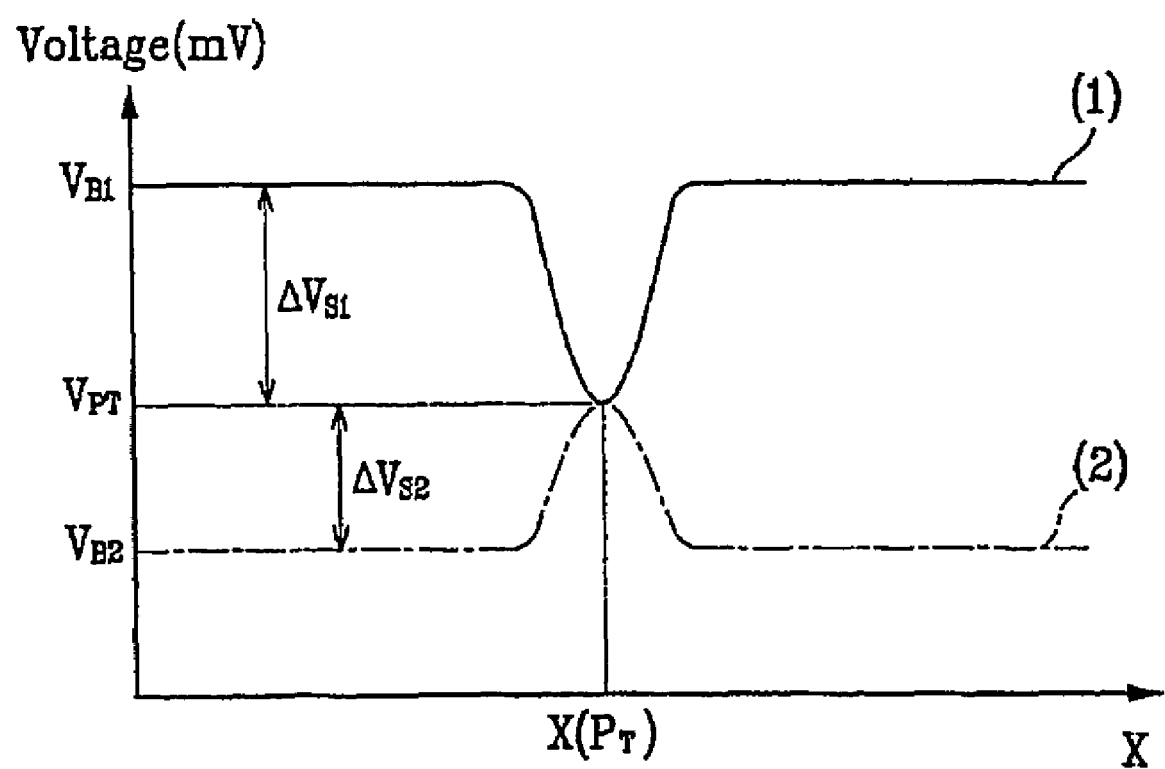
FIG. 12 illustrates waveforms of sensing signals of a photosensor in a display area depending on sensing modes in an LCD device according to another exemplary embodiment of the present invention.
Figure 13:
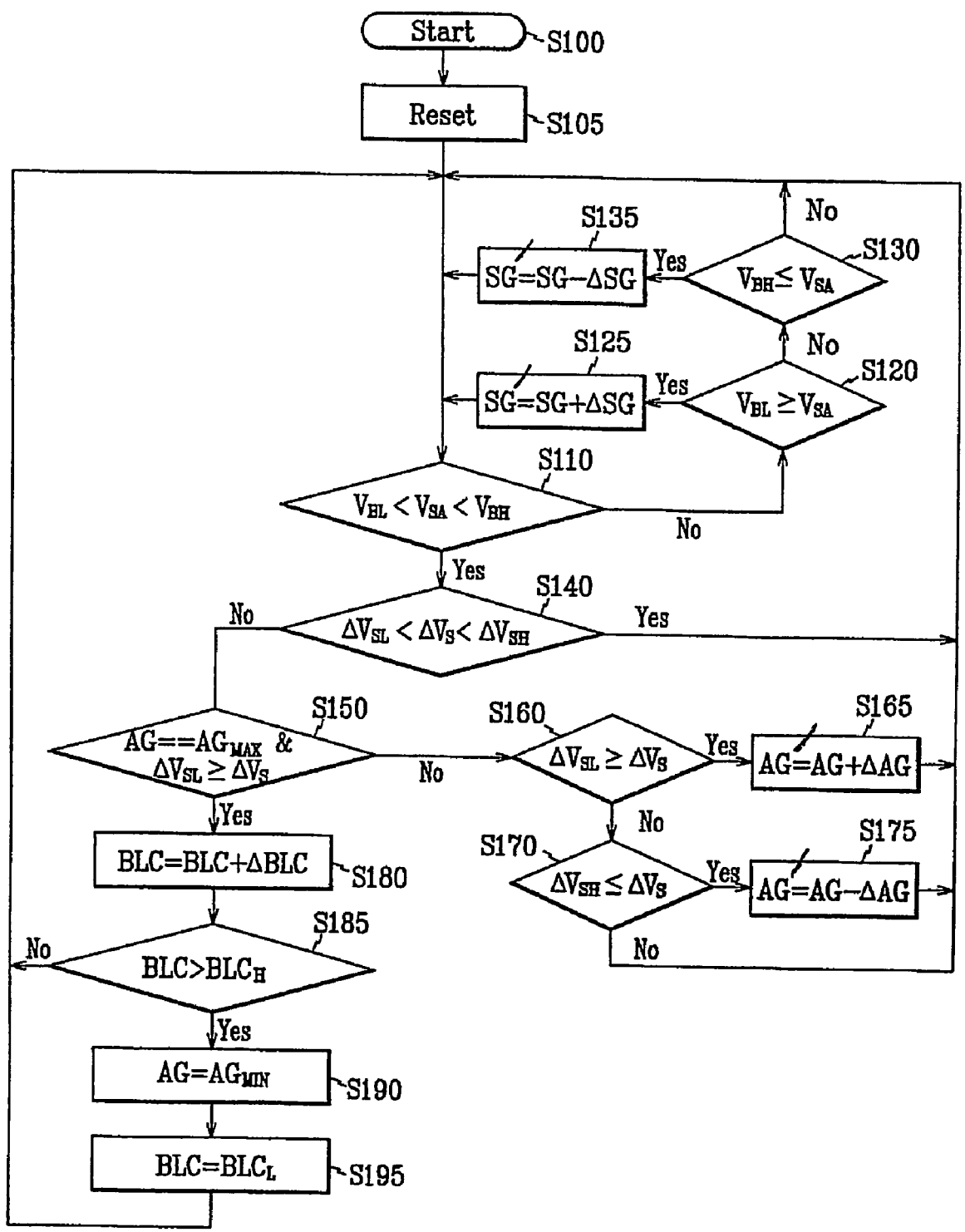
FIG. 13 is an exemplary flow chart for controlling sensing signals of photosensor in a display area in an LCD device according to another exemplary embodiment of the present invention.

FIG. 12 illustrates waveforms of sensing signals of a PSDA depending on sensing modes in an LCD device according to another exemplary embodiment of the present invention, and FIG. 13 is an exemplary flow chart for controlling sensing signals of a PSDA in an LCD device according to another exemplary embodiment of the present invention.

The LCD device according to this exemplary embodiment includes the sensing signal processor 800, the signal controller 600, the backlight unit 900 and the driving voltage generator 950 as shown in FIG. 8.

The sensing signal processor 800 includes the sensing signal regulator 810 and the analog to digital converter 820, and the signal controller 600 includes the signal input unit 610, the operation unit 620 and the control signal output unit 630. Operations of the sensing signal processor 800 and the signal input unit 610 are substantially same as described above referring to FIG. 8 and thus a detailed description will be omitted.

Waveforms of the sensing signals of the PSDA responsive to a touch will now be described.

In FIG. 12, a transverse axis represents an X coordinate about the sensing signal lines $P_1$-$P_m$ of the LC panel assembly 300 and a longitudinal axis represents voltage levels corresponding to the sensing signals $V_{P1}$-$V_{PM}$ in the X coordinate. The sensing signals $V_{P1}$-$V_{PM}$ are output signals of the PSDA connected to, for example, one of the sensing scanning lines Si, and it is assumed a touch occurs at an intersection of the one of the sensing scanning lines Si and one of the sensing signal lines $P_T$. In addition, for convenience of explanation, a sensing signal $V_{PT}$ of the PSDA in a touched position $X(P_T)$ is referred to as "touch voltage," and sensing signals $V_{B1}$ and $V_{B2}$ of the PSDA in a not touched position are referred to as "background voltages."

Waveform (1) in FIG. 12 is a sensing signal waveform in a sensing mode called a shadow mode in which the touch voltage $V_{PT}$ is lower than the background voltage $V_{B1}$, and waveform (2) in FIG. 12 is a sensing signal waveform in a sensing mode called a backlight mode in which the touch voltage $V_{PT}$ is higher than the background voltage $V_{B2}$. The shadow mode represents that the intensity of the ambient light is high (bright), and, in such a case, an amount of ambient light is greater than an amount of the reflected LBU by the touch, and thus the touch voltage $V_{PT}$ is smaller than the background voltage $V_{B1}$. The backlight mode represents that the intensity of the ambient light is lower (darker), and, in such a case, the ambient light is smaller than the reflected LBU, and thus the touch voltage $V_{PT}$ is larger than the background voltage $V_{B2}$. The background voltages $V_{B1}$ and $V_{B2}$ are mainly determined depending on the intensity of the ambient light, and the touch voltage is $V_{PT}$ mainly determined depending on a luminance of the backlight unit 900.

The signal controller 600 receives the sensing signals $V_{P1}$-$V_{PM}$ corresponding to the waveform (1) or the waveform (2) in FIG. 12 and compares magnitudes thereof to decide whether or not a touch has occurred and a touch position. In other words, the signal controller 600 decides an existence of a voltage level exceeding a predetermined range of a level of a background voltage to be a touch and thereafter extracts the touch position.

However, if an LCD device lies between the shadow mode and the backlight mode, in other words, when a difference between the background voltages $V_{B1}$-$V_{B2}$ and the touch voltage $V_{PT}$ (represented by $\Delta V_{S1}$ and $\Delta V_{S2}$) is small, determination of whether a touch occurred or not and a touch position are difficult to discriminate. Therefore, sensing signals are required to be kept at a predetermined magnitude.

The operation unit 620 and the control signal output unit 630 of an LCD device in which the sensing signals are controlled such that $\Delta V_{S1}$ and $\Delta V_{S2}$ are kept at a predetermined magnitude, according to another exemplary embodiment of the present invention will now be described in detail with reference to FIG. 13.

A PSDA at the touched position $X(P_T)$ is blocked from ambient light by a touch and is substantially in the same state as the second reference photosensor PSB blocked from ambient light. Therefore, the touch voltage $V_{PT}$ and the sensing signal of the second reference photosensor PSB have substantially same voltage levels. In addition, a PSDA in a no touch position is supplied with ambient light and the LBU and is substantially in the same state as the first reference photosensor PSA. Accordingly, the background voltage and the sensing signal of the first reference photosensor PSA have substantially same voltage levels. As a result, a difference between a background voltage and a touch voltage in touched and no touch positions is substantially the same as a difference between the first reference photosensor PSA and the second reference photosensor PSB $\Delta V_S$, respectively. In the present embodiment, a magnitude of a control voltage of the PSDA is controlled and the gain of the sensing signal regulator 810 and the luminance of the lamps of the backlight unit 900 are controlled using the first and second reference photosensors PSA and PSB such that the difference $\Delta V_S$ may lie within a predetermined range.

In the present embodiment, for convenience of explanation, the same reference numerals are used for the backlight control signal BLC and a backlight control variable for calculating the backlight control signal BLC, the gain control signal AG and a gain control variable, and the voltage control signal SG and a voltage control variable, respectively, and the control signal output unit 630 transmits calculated control variables BLC, AG and SG to the backlight unit 900, the sensing signal regulator 810 and the driving voltage generator 950 as control signals, respectively.

First, the operation starts (S100), and the operation unit 620 and the control signal output unit 630 initialize the backlight unit 900 and the sensing signal regulator 810 (S105). The control signal output unit 630 substitutes the backlight control variable BLC for a backlight minimum value $BLC_L$ for transmittance to the backlight unit 900, and substitutes the gain control variable AG for a gain middle value $AG_{MID}$ for transmittance to the sensing signal regulator 810. Then, the backlight unit 900 operates with a standard constant current, e.g., 15 mA responsive to the backlight minimum value $BLC_L$.

Subsequently, the operation unit 620 compares a sensing signal $V_{SA}$ with set-up values $V_{BL}$ and $V_{BH}$ (S110).

Following comparison at operation S110, in response to the sensing signal $V_{SA}$ being less than the value $V_{BL}$ and more than the value $V_{BH}$, the sensing signal $V_{SA}$ is compared with the value $V_{BL}$ again (S120).

As a result, in response to the sensing signal $V_{SA}$ being less than the value $V_{BL}$, a voltage variation value $\Delta SG$ is added to the voltage control variable SG to produce a modified voltage control variable SG' (S125), and in response to the sensing signal $V_{SA}$ being more than the value $V_{BL}$, the sensing signal $V_{SA}$ is compared with the value $V_{BH}$ (S130).

Following comparison at operation S130, in response to the sensing signal $V_{SA}$ being more than the value $V_{BH}$, the voltage variation value $\Delta SG$ is subtracted from the voltage control variable SG to produce the modified voltage control variable SG' (S135), and in response to the sensing signal $V_{SA}$ being less than the value $V_{BL}$, operation S110 is repeated.

During operations S110 to S135, the control voltages $V_{SG}$ of the PSDA and the first and second reference photosensors PSA and PSB are controlled such that the sensing signal $V_{SA}$ of the first reference photosensor PSA may lie between the value $V_{BL}$ and the value $V_{BH}$. In this way, a background voltage and a touch voltage lie within the predetermined range and thus the sensing signal of the PSDA is inputted to the signal controller 600 without distortion.

Alternatively, input voltages instead of the control voltages $V_{SG}$ of the PSDA and the first and second reference photosensors PSA and PSB are controlled such that the sensing signal $V_{SA}$ of the first reference photosensor PSA may lie between the value $V_{BL}$ and the value $V_{BH}$.

Following comparison at operation S110, in response to the sensing signal $V_{SA}$ being between the value $V_{BL}$ and the value $V_{BH}$, the difference $\Delta V_S$ of the sensing signals of the first and second reference photosensors PSA and PSB is compared with set-up values $\Delta V_{SL}$ and $\Delta V_{SH}$ (S140).

As a result, in response to the difference $\Delta V_S$ being between the value $\Delta V_{SL}$ and the value $\Delta V_{SH}$, operation S110 is repeated, and in response to the difference $\Delta V_S$ being less than $\Delta V_{SL}$ or more than $\Delta V_{SH}$, the gain control variable AG is compared with a gain maximum value $AG_{MAX}$ and the difference $\Delta V_S$ is compared with the value $\Delta V_{SL}$ (S150)

Following comparison at operation S150, in response to the gain control variable AG being different from the gain maximum value $AG_{MAX}$ or the difference $\Delta V_S$ being more than $\Delta V_{SL}$, the difference $\Delta V_S$ is compared with the value $\Delta V_{SL}$ (S160).

As a result, in response to the difference $\Delta V_S$ being less than the value $\Delta V_{SL}$, a gain variation value $\Delta AG$ is added to the gain control variable AG to produce a modified gain control variable AG' (S165), and in response to the difference $\Delta V_S$ being more than the value $\Delta V_{SL}$, the difference $\Delta V^S$ is compared with the value $\Delta V_{SH}$ (S170).

Following comparison at operation S170, in response to the difference $\Delta V_S$ being more than the value $\Delta V_{SH}$, the gain variation value $\Delta AG$ is subtracted from the gain control variable AG to produce the modified gain control variable AG' (S175), and in response to the difference $\Delta V_S$ being less than the value $\Delta V_{SH}$, operation S110 is repeated.

In operations S140 to S175, the gain of the sensing signal regulator 810 is controlled such that the difference $\Delta V_S$ of the first and second reference photosensors PSA and PSB may lie between the value $\Delta V_{SL}$ and the value $\Delta V_{SH}$. For example, for a small difference $\Delta V_S$, the gain of the sensing signal regulator 810 is increased, but, for a large difference $\Delta V_S$, the gain of the sensing signal regulator 810 is decreased. In this way, the difference $\Delta V_S$ lying within the predetermined range discriminates the background voltage and the touch voltage clearly, thereby judging whether a touch has occurred or not.

Following comparison at operation S150, in response to the gain control variable AG being the gain maximum value $AG_{MAX}$ and the difference $\Delta V_S$ being less than the value $\Delta V_{SL}$, a backlight variation value $\Delta BLC$ is added to the backlight control variable BLC (S180) and the backlight control variable BLC is compared with a backlight maximum value $BLC_H$ (S185).

Following comparison at operation S185, in response to the backlight control variable BLC being less than the backlight maximum value $BLC_H$, operation S110 is repeated, and in response to the backlight control variable BLC being more than the backlight maximum value BLCH, the gain control variable AG is substituted for the gain minimum value $AG_{MIN}$ (S190), and then the backlight control variable BLC is substituted for the backlight minimum value $BLC_L$ (S195) and operation S110 is repeated.

In operations S150 to S165, in response to the difference $\Delta V_S$ being not more than the value $\Delta V_{SL}$ regardless of how the gain of the sensing signal regulator 810 is regulated, the luminance of the backlight unit 900 is increased for enlarging the difference $\Delta V_S$. In other words, when there is no discrimination of the background voltage and the touch voltage no matter how the gain of the sensing signal regulator 810 is regulated due to weak intensity of the ambient light, the luminance of the backlight unit 900 is increased to enlarge the sensing signal $V_{SB}$ of the second reference photosensor PSB and the touch voltage of the PSDA. Then, the sensing mode of the LCD device is changed from shadow mode to backlight mode and the background voltage and the touch voltage are discriminated.

In operations S180 to S185, in response to the difference $\Delta V_S$ being less than the value $\Delta V_{SL}$ whether or not the backlight control variable BLC is more than the backlight maximum value $BLC_H$, intensity of ambient light is determined to be increased and thus the gain of the sensing signal regulator 810 is minimized and the luminance of the backlight unit 900 is allowed to have the minimum value in operations S190 to S195. Accordingly, in the sensing mode, the backlight mode is changed to the shadow mode and thus the background voltage and the touch voltage are discriminated.

As described above, the control voltage of the PSDA, the gain of the sensing signal regulator 810 and the luminance of the backlight unit 900 are controlled using the sensing signals $V_{SA}$ and $V_{SB}$ of the first and second reference photosensors PSA and PSB and the difference $\Delta V_S$ of the sensing signals $V_{SA}$ and $V_{SB}$ such that the background voltage and the touch voltage of the PSDA may be discriminated. Accordingly, the signal controller 600 receives the sensing signal of the PSDA to determine whether or not a touch has occurred and a touch position.

In the present embodiment, the signal input unit 610, the operation unit 620 and the control signal output unit 630 are implemented by digital logics such as programming using a microprocessor or ASIC application specific integrated circuit to be included in one-chip or to be included in a chip comprising the sensing signal processor.

Although a LCD device provided with a backlight unit has been described above, the present invention is not limited thereto, but may be employed in other non-emissive display devices provided with a backlight unit.

According to the present invention, the LCD includes a first reference photosensors dependent on ambient light and LBU and a second reference photosensors dependent on only the LBU to judge intensity of ambient light from sensing signals of the second reference photosensors, thereby performing the photo-sensing of a PSDA accurately and controlling a luminance of a backlight unit.

In addition, it is possible to acquire a sensing signal of the PSDA able to judge touch information depending on a touch by controlling the sensing signal of the PSDA using the sensing signals of the reference photosensors although external circumstances vary.

While the present invention has been described in detail with reference to exemplary embodiments, it should be understood that the invention is not limited to the disclosed embodiments, but, on the contrary, is intended to cover various modifications and equivalent arrangements included within the sprit and scope of the appended claims.

What is claimed is:

1. A display device comprising:
a panel assembly;
a backlight unit supplying light to the panel assembly;
a first photosensor supplied with ambient light and light from the backlight unit to generate a first sensing signal;
a second photosensor blocked from the ambient light and receiving the light from the backlight unit to generate a second sensing signal;
a sensing signal processor receiving the first and second sensing signals from the first and second photosensors for processing; and
a signal controller determining a sensing state in response to an intensity of the ambient light determined responsive to processed first sensing signals and processed second sensing signals from the sensing signal processor and performing a predetermined control operation responsive to the sensing state,
wherein the signal controller controls a gain of the sensing signal processer to regulate a magnitude of the first sensing signal.

2. The display device of claim 1, wherein the signal controller generates at least one state judgment signal responsive to the processed first and second sensing signals and determines the sensing state in response to the at least one state judgment signal, and the at least one state judgment signal comprises a first judgment signal corresponding to a difference between the processed first and second sensing signals.

3. The display device of claim 2, wherein the signal controller controls a luminance of the backlight unit in response to the sensing state.

4. The display device of claim 2, wherein the first photosensor comprises a sensing element, and the signal controller controls a control voltage of the sensing element to regulate a sensitivity of the first photosensor.

5. The display device of claim 2, wherein the sensing signal processor amplifies the first and second sensing signals and converts amplified first and second sensing signals into digital signals.

6. The display device of claim 2, wherein the at least one state judgment signal further comprises:
a second judgment signal corresponding to a difference between an input allowable maximum signal of the sensing signal processor and the processed first sensing signal; and
a third judgment signal corresponding to a difference between the input allowable minimum signal and the processed second sensing signal.

7. The display device of claim 6, wherein the sensing state comprises one of a first state and a second state, and
in the first state which is an initial state, in response to the first judgment signal being greater than a first set-up value and the second judgment signal being less than a second set-up value, the signal controller changes from the first state to the second state, and in response to one of the first judgment signal being less than the first set-up value and the second judgment signal being greater than the second set-up value, the signal controller maintains the first state, and
in the second state, in response to the first judgment signal being less than a third set-up value and the third judgment signal being less than a fourth set-up value, the signal controller changes from the second state to the first state, and in response to one of the first judgment signal being greater than the third set-up value and the third judgment signal being more than the fourth set-up value, the signal controller maintains the second state.

8. The display device of claim 6, wherein the sensing state comprises one of a first state, a second state, and a third state, and
in the first state which is an initial state, in response to the first judgment signal being greater than a first set-up value and the second judgment signal is greater than a second set-up value, the signal controller changes from the first state to the second state, and in response to the first judgment signal being greater than the first set-up value and the second judgment signal being less than the second set-up value, the signal controller changes from the first state to the third state, and in response to the first judgment signal being less than the first set-up value, the signal controller maintains the first state, and
in the second state, in response to the first judgment signal being less than a third set-up value, the signal controller changes from the second state to the first state, and in response to the first judgment signal being greater than the third set-up value and the second judgment signal being greater than a fourth set-up value, the signal controller maintains the second state, and in response to the first judgment signal being greater than the third set-up value and the second judgment signal being less than the fourth set-up value, the signal controller changes from the second state to the third state, and in the third state, in response to the first judgment signal being less than a fifth set-up value, the signal controller changes from the third state to the first state, and in response to the first judgment signal being greater than the fifth set-up value, the signal controller maintains the third state.

9. The display device of claim 1, wherein the first and the second photosensors comprise a sensing element containing amorphous silicon or poly-silicon.

10. The display device of claim 1, wherein the first photosensor is provided in a display area of the panel assembly and the second photosensor is provided exterior to the display area.

11. The display area of claim 1, farther comprising a temperature sensor blocked from the ambient light and the light from the backlight unit and generating a third sensing signal, and flirt her performing the predetermined control operation in response to the third sensing signal.

12. A driving method of a display device provided with a backlight unit supplying light comprising:

receiving ambient light and the light from the backlight unit at a first photosensor to generate a first sensing signal;

blocking the ambient light and receiving the light from the backlight unit at a second photosensor to generate a second sensing signal;

generating a state judgment signal in response to the first and the second sensing signals; and determining a sensing state in response to an intensity of the ambient light as indicated by the state judgment signal, wherein the state judgment signal represents a difference between the first and second sensing signals, and a gain of the first sensing is controlled regulating a magnitude of the first sensing signal.

13. The method of claim 12, wherein the regulating the magnitude of the first sensing signal is within a predetermined range.

14. The method of claim 12, further comprising regulating a luminance of the backlight unit in response to the sensing state.

15. A display device comprising:
a panel assembly;
a backlight unit supplying light to the panel assembly;
a first photosensor receiving ambient light and light from the backlight unit to generate a first sensing signal;
a second photosensor blocked from the ambient light and receiving the light from the backlight unit to generate a second sensing signal;
a third photosensor receiving the ambient light and the light from the backlight unit to generate a third sensing signal responsive to touch;
a sensing signal processor processing the first to third sensing signals from the first to third photosensors; and
a signal controller regulating the third sensing signal responsive to processed first and second sensing signals, wherein the signal controller controls a gain of the sensing signal processor to regulate a magnitude of the first sensing signal.

16. The display device of claim 15, wherein the signal controller regulates the third sensing signal such that a difference between the processed first and second sensing signals is between a first set-up value and a second set-up value.

17. The display device of claim 16, wherein the signal controller regulates a control voltage inputted to the third photosensor for regulating the third sensing signal.

18. The display device of claim 16, wherein the signal controller regulates a gain of the sensing signal processor for regulating the third sensing signal.

19. The display device of claim 16, wherein the signal controller regulates a luminance of the backlight unit for regulating the third sensing signal.

20. The display device of claim 16, wherein the signal controller regulates a control voltage inputted to the third photosensor such that a value of the processed first sensing signal is between a third set-up value and a fourth set-up value.

21. The display device of claim 20, wherein, in response to the processed first sensing signal being less than the third set-up value, a voltage variation value is added to the control voltage, and in response to the processed sensing signal being greater than the fourth set-up value, the voltage variation value is subtracted from the control voltage.

22. The display device of claim 16, wherein, in response to the difference being less than the first set-up value, a gain variation value is added to a gain of the sensing signal processor, and in response to the difference being greater than the second set-up value, the gain variation value is subtracted from the gain of the sensing signal processor.

23. The display device of claim 22, wherein, in response to the gain of the sensing signal processor being a gain maximum value and the difference being less than the first set-up value, the luminance of the backlight unit is increased by a predetermined variation.

24. The display device of claim 23, wherein, in response to the luminance of the backlight unit being a maximum variation value, the gain of the sensing signal processor is changed into a gain middle value and the luminance of the backlight unit is changed to a minimum variation value.

25. The display device of claim 15, wherein the first and the second photosensors include first and second sensing elements, respectively, and the processed first and second sensing signals are average values of output signals of the first and the second sensing elements, respectively.

26. The display device of claim 15, wherein the first and the third photosensors are provided in a display area of the panel assembly and the second photosensor is provided exterior to the display area.

27. The display device of claim 15, further comprising a light blocking member blocking the second photosensor from the ambient light.

28. The display device of claim 27, wherein the light blocking member is a black matrix preventing a light-leakage of the panel assembly.

29. The display device of claim 27, wherein the light blocking member is a reflective member reflecting the ambient light.

30. The display device of claim 15, wherein the sensing signal processor and the signal controller are included in a one-chip.

31. A driving method of a display device provided with a backlight unit supplying light comprising:

receiving ambient light and light from the backlight unit at a first photosensor to generate a first sensing signal;

blocking the ambient light and receiving the light from the backlight unit at a second photosensor to generate a second sensing signal;

receiving the ambient light and the light from the backlight unit at a third photosensor to generate a third sensing signal responsive to touch; and regulating the third sensing signal in response to the first and the second sensing signals, wherein a gain of the first sensing signal is controlled regulating a magnitude of the first sensing signal.

32. The driving method of claim 31, wherein the regulating the third sensing signal further comprises regulating the third sensing signal such that a difference between the first and the second sensing signals lies between a first set-up value and a second set-up value.

* * * * *